(12) United States Patent
Sandrin et al.

(10) Patent No.: US 12,440,187 B2
(45) Date of Patent: Oct. 14, 2025

(54) ELASTOGRAPHY DEVICE AND METHOD

(71) Applicant: ECHOSENS, Paris (FR)

(72) Inventors: Laurent Sandrin, Bourg-la-Reine (FR); Stéphane Audiere, Paris (FR)

(73) Assignee: ECHOSENS SA, Paris (FR)

( * ) Notice: Subject to any disclaimer, the term of this patent is extended or adjusted under 35 U.S.C. 154(b) by 100 days.

(21) Appl. No.: 18/317,401

(22) Filed: May 15, 2023

(65) Prior Publication Data
US 2024/0382177 A1 Nov. 21, 2024

(51) Int. Cl.
*A61B 8/00* (2006.01)
*G01S 7/52* (2006.01)

(52) U.S. Cl.
CPC .............. *A61B 8/485* (2013.01); *A61B 8/543* (2013.01); *G01S 7/52042* (2013.01); *A61B 8/463* (2013.01)

(58) Field of Classification Search
CPC .. A61B 8/485; A61B 8/463; G01R 33/56358; G01S 7/52042
See application file for complete search history.

(56) References Cited

U.S. PATENT DOCUMENTS

| | | | | |
|---|---|---|---|---|
| 8,971,602 B2 * | 3/2015 | Glaser | ................... | A61B 5/4244 |
| | | | | 600/410 |
| 2007/0055149 A1 * | 3/2007 | Suzuki | ............... | A61B 5/02007 |
| | | | | 600/437 |
| 2009/0105589 A1 * | 4/2009 | Osaka | ....................... | A61B 8/06 |
| | | | | 600/443 |
| 2011/0301468 A1 * | 12/2011 | Sandrin | ................ | A61B 5/6843 |
| | | | | 73/575 |
| 2014/0155746 A1 * | 6/2014 | Tanigawa | ................ | A61B 8/485 |
| | | | | 600/438 |
| 2015/0119710 A1 * | 4/2015 | Kawae | ....................... | A61B 8/14 |
| | | | | 600/438 |
| 2020/0029934 A1 * | 1/2020 | Sandrin | ..................... | A61B 8/08 |
| 2021/0045709 A1 * | 2/2021 | Li | .............................. | A61B 8/08 |
| 2022/0192640 A1 * | 6/2022 | Vignon | .................... | A61B 8/485 |
| 2022/0249061 A1 * | 8/2022 | Carrascal | ............... | G06T 7/0012 |

FOREIGN PATENT DOCUMENTS

JP 2015-188514 A 11/2015

OTHER PUBLICATIONS

Villemain, Olivier, et al. "Toward noninvasive assessment of CVP variations using real-time and quantitative liver stiffness estimation." JACC: Cardiovascular Imaging 10.10 Part B (2017): 1285-1286. (Year: 2017).*

(Continued)

*Primary Examiner* — Sean D Mattson
(74) *Attorney, Agent, or Firm* — Pillsbury Winthrop Shaw Pittman LLP

(57) ABSTRACT

An elastography device includes an electronic unit adapted to determine a plurality of measurements of a mechanical property of a region of a body of a subject, the electronic unit being further adapted to receive a cardiac signal relative to a cardiac activity of the subject, wherein at least one measurement of the mechanical property among the plurality of measurements of the mechanical property is determined upon detection of an event relative to the cardiac signal.

20 Claims, 8 Drawing Sheets

(56) References Cited

OTHER PUBLICATIONS

Piecha, Felix, et al. "Arterial pressure suffices to increase liver stiffness." American Journal of Physiology-Gastrointestinal and Liver Physiology 311.5 (2016): G945-G953. (Year: 2016).*
"EASL Clinical Practice Guidelines on non-invasive tests for evaluation of liver disease severity and prognosis—2021 update," European Association for the Study of the Liver, Journal of Hepatology, May 2021, vol. 75, No. 3, pp. 659-689.
Loree, H., et al., "Vibration-Guided Transient Elastography. A Novel Fibroscan® Examination with Improved Guidance for Liver Stiffness Measurement," Ultrasound Med Biol, (Year: 2020), vol. 46, No. 9, pp. 2193-2206.
Tzschätzsch, H., et al., "In vivo time-harmonic ultrasound elastography of the human brain detects acute cerebral stiffness changes induced by intracranial pressure variations," Scientific Reports, Dec. 2018, vol. 8, No. 1, pp. 1-9.
Mellema, D. C., et al., "Probe Oscillation Shear Elastography (PROSE): A High Frame-Rate Method for Two-Dimensional Ultrasound Shear Wave Elastography," IEEE transactions on medical imaging, Sep. 2016, vol. 35, No. 9, pp. 2098-2106.
Byenfeldt, M., et al., "Influence of Probe Pressure on Ultrasound-Based Shear Wave Elastography of the Liver Using Comb-Push 2-D Technology," Ultrasound in Medicine and Biology, vol. 45, Issue 2, (Year: 2018), 411-428 (1-18).
Pierce, T. T., et al., "Variability of ultrasound-based methods to assess liver stiffness in NAFLD," The International Liver Congress, presented during the liver meeting of the European Association for the study of the Liver in 2022, (Year: 2022), 1 page.
Taniguchi, T. (MD), et al., "Usefulness of Transient Elastography for Noninvasive and Reliable Estimation of Right-Sided Filling Pressure in Heart Failure," © 2014 Elsevier Inc., (Year: 2014), pp. 552-558.
Hsu, S. (MD), "Hemodynamics for the Heart Failure Clinician: A State-of-the-Art Review," Journal of Cardiac Failure, (Year: 2021), 15 pages.
Dhillon, J. K., et al., "Use of liver stiffness measurements in acute decompensated heart failure: new applications of a non-invasive technique," ECS Heart Failure, (Year: 2022), 8 pages.
Taniguchi, T. (MD), et al., "Liver Stiffness Reflecting Right-Sided Filling Pressure Can Predict Adverse Outcomes in Patients With Heart Failure," JACC: Cardiovascular Imaging, vol. 12, No. 6, © 2019 by the American College of Cardiology Foundation, (Year: 2019), pp. 955-964.
Millonig, G., et al., "Liver stiffness is directly influenced by central venous pressure," Research Article, Journal of Hepatology, (Year: 2009), 5 pages.
Extended European Search Report as issued in European Patent Application No. 23173298.3, dated Nov. 6, 2023.

* cited by examiner

ELASTOGRAPHY DEVICE AND METHOD

FIELD

The present invention relates to the field of elastography, for example liver elastography. More specifically, the invention relates to an elastography device and an elastography method to accurately determine a measurement of the liver stiffness of a subject.

BACKGROUND

Measuring liver stiffness (LS) has been shown to be a very useful tool to help health care professionals detect or characterize liver disease or damages, and more generally monitor the condition of the liver of a subject.

There are basically two kinds of elastography devices for liver stiffness measurement (LSM): imaging devices which derive the LSM from an image of stiffness using for example Shear Wave Elastography, SWE, (as detailed for example in "Influence of Probe Pressure on Ultrasound-Based Shear Wave Elastography of the Liver Using Comb-Push 2-D Technology", Byenfeldt, Marie et al. Ultrasound in Medicine and Biology, Volume 45, Issue 2, 411-428) and devices which derive an average LSM using for example Vibration-Controlled Transient Elastography (hereinafter referred to as VCTE), such as the FibroScan® system.

With the FibroScan® system, an operator places the tip of a probe, that has a rather small diameter (typically comprised between 5 and 10 mm), in contact with the subject's body, in front of the expected area of a subject's liver. The operator then presses a button to make the probe's tip deliver to the subject a transient, low frequency mechanical pulse (the spectrum of this pulse is centered on a frequency comprised typically between 10 and 500 hertz). This pulse generates elastic waves that travel in the subject's body. An ultrasound transducer mounted on the probe's tip, in contact with the subject's body, then emits a number of ultrasound shots into the tissue, with a high repetition rate, of 6 kilohertz for instance. The echo signals, corresponding to the backscattering of the different ultrasound shots emitted, are acquired by the probe to track slight movements of the tissue caused by the elastic waves passing through. The tracking is performed using correlation techniques applied to successive echo signals. The detected movements enable one to compound an elastic wave propagation image showing the tissue deformation both as a function of depth z, and as a function of time t, sometimes referred to as an "elastogram" (also called "strain map" or "displacements" or "shear wave propagation map"). An example of an elastogram is represented in FIG. 1.

The mechanical pulse delivered by the probe's tip generates both a shear wave and of a compression wave. In other words, the elastic waves mentioned above combine a shear wave and a compression wave. These two waves have very different propagation speeds and, thanks to the transient nature of the mechanical excitation, they can be easily separated in time and identified in the elastic wave propagation image. For example, referring to FIG. 1, this figure shows an elastic wave propagation image 105. In FIG. 1, the compression wave is identified by the reference sign 105C, while the much slower shear wave is identified by the reference sign 105S. Also shown in FIG. 1, is a region of interest (ROI) which is bound by two dashed lines at 25 mm and 65 mm, which corresponds to the depth under the patient skin where liver is typically located. This elastic wave propagation image can thus be used to precisely determine the propagation speed of shear waves in the tissue to be characterized, from which the stiffness of this tissue can be derived. These stiffness results are then provided to the operator.

The VCTE-based elastography devices typically provide several measurements of Liver Stiffness (or other part of the body, the system not being limited to evaluation of liver condition) collected at different timepoints when the operator triggers measurements. From these several measurements, a unique value representative of the LSM is then provided as an average (mean or median) of the measurements collected in the image based on a Region Of Interest (ROI) positioning and/or at different timepoints.

In general, to obtain a reliable measurement of liver stiffness, the manufacturer recommends that a series of 10 measurements of liver stiffness be obtained as detailed above, and the final liver stiffness measurement is calculated from these measurements. For example, the final measurement corresponds to the mean or the median of the series of measurements. Each measurement of the series of measurements is therefore triggered by the operator (for example by pressing a button to generate a transient displacement) at respective times.

Even if this technology works well and provides very satisfying results, it is known that there is a variability in the measurements of the series of measurements which can be quite large. Such variability is mentioned, for example, in the poster "Variability of ultrasound-based methods to assess liver stiffness in NAFLD" by Theodore T. Pierce et al. presented during the liver meeting of the European Association for the study of the Liver in 2022. While this variability had until now been mainly attributed to the conditions for carrying out the measurements (position of the subject, inclination of the probe, liver movements, etc.) and to the subject's respiratory cycle, the inventors of the present invention investigated whether other factors could explain this variability, and how such factors might be considered in the evaluation of the liver stiffness of the subject.

SUMMARY

An aspect of the invention relates to an elastography device comprising an electronic unit adapted to determine a plurality of measurements of a mechanical property of a region of a body of a subject, the electronic unit being further adapted to receive a cardiac signal related to a cardiac activity of the subject, wherein at least one measurement of the mechanical property among the plurality of measurements of the mechanical property is determined upon detection of an event related to the cardiac signal.

By "mechanical property", it is meant any physical property or parameter relating to the behavior of the region of the human body when subjected to one or more mechanical stresses. For example, the mechanical property may be stiffness, elasticity, Young's modulus, shear modulus, shear wave speed, viscoelasticity, viscosity, etc. The mechanical property may also be any value derived from one or more of these physical properties or parameters.

In the following, particular reference is made to stiffness, but aspects of the invention apply to other mechanical properties. Also, particular reference is made to the liver as a region of the body, but aspects of the invention could apply to other regions of the body, such as the brain.

By "event related to the cardiac signal", it is meant any predefined event that may be detected in the cardiac signal. For example, the event may correspond to an upward or downward peak in the cardiac signal, which may be detected by detecting that a rising or a falling edge of the cardiac signal reaches a predefined threshold.

As detailed below, the inventors have demonstrated that the stiffness of a region of a subject's liver was not, contrary to what one might think, a constant value, but, instead, it varies over time. In particular, it was found that the variations of a cardiac signal over time can be found in the measurement of the stiffness of the liver. In other words, the stiffness of the liver is a function whose values vary over time, in particular during a cardiac cycle. Therefore, determining measurements of the stiffness (or another mechanical property) based on an event in the cardiac signal has a relevant medical value, and makes it possible to more accurately determine certain indicators relating to stiffness (the median of the signal, for example). For example, the determinations of the measurements may be synchronized with particular moments or instants of the cardiac cycles, which increases the accuracy of the measurement, as detailed below.

It is noted that, in some embodiments, at least one measurement among the plurality of measurement may be triggered by the detection of at least one event related to the cardiac signal. By "triggered", it is meant that a series of actions to determine a measurement is performed (in the case of transient elastography for example, the detection of an event can trigger the emission of a low frequency mechanical pulse and a corresponding sequence of ultrasound pulses).

In other embodiments, measurements may be "triggered" continuously (for example at a predefined time period, for example each 0.1 second), but the corresponding measurement is captured (or "kept", if the mechanical property is continuously computed) only if it corresponds to an event related to the cardiac signal. It will be appreciated that "continuously" means herein "without waiting for an event related to the cardiac signal to occur", for example periodically.

Therefore, in various aspects of the present invention "determine a measurement" can either mean "trigger and determine a measurement" or "compute a measurement" or "hold a computed measurement", depending on the embodiments.

The invention may be carried out by any elastography device, that is to say any device for imaging or characterizing a biomechanical property of a biological tissue in a non-invasive way by applying a force to the tissue so as to generate a deformation or a displacement of the tissue. For example, the elastography device may use an ultrasound elastography technique, for example transient elastography, a magnetic resonance elastography technique or an optical elastography technique.

For example, the invention may be used with any elastography technique such as vibration-guided transient elastography, time harmonic elastography or probe oscillation shear elastography. These techniques are for example described in the following articles:

Loree, H.; Bastard, C.; Miette, V.; Sandrin, L. (2020), "Vibration-Guided Transient Elastography. A Novel Fibroscan® Examination with Improved Guidance for Liver Stiffness Measurement", Ultrasound Med Biol, vol. 46, n° 9, p. 2193-2206;

Tzschätzsch, Heiko; Kreft, Bernhard; Schrank, Felix; Bergs, Judith; Braun, Jürgen; Sack, Ingolf (2018), "In vivo time-harmonic ultrasound elastography of the human brain detects acute cerebral stiffness changes induced by intracranial pressure variations", Scientific Reports, vol. 8, n° 1, p. 17888;

Mellema, Daniel C.; Song, Pengfei; Kinnick, Randall R.; Urban, Matthew W.; Greenleaf, James F.; Manduca, Armando; Chen, Shigao (2016), "Probe Oscillation Shear Elastography (PROSE): A High Frame-Rate Method for Two-Dimensional Ultrasound Shear Wave Elastography", IEEE transactions on medical imaging, vol. 35, n° 9, p. 2098-2106.

In some embodiments, the present invention may be implemented in the context of Transient Elastography techniques, including ARFI (Acoustic Radiation Force Impulse), SWE (Shear Wave Elastography) or VCTE (Vibration-Controlled Transient Elastography).

Therefore, in one or several embodiments, the elastography device may comprise:
  a probe that comprises: a protruding part to be applied against the body of the subject and at least one ultrasound transducer;
wherein, for determining each of the measurements of the mechanical property, the electronic unit is adapted to:
  deliver to the body of the subject, via the protruding part, a transient, low frequency mechanical pulse;
  upon delivery of the mechanical pulse, control the ultrasound transducer to emit a sequence of ultrasound pulses, and acquire echo signals received in response by the ultrasound transducer to track how a low frequency elastic wave induced by the mechanical pulse propagates through the region of the body of the subject, and
  determine the respective measurement of the mechanical property related to low frequency elastic wave propagation.

In particular, the elastography device may be a VCTE device. In this case, the probe may further comprise a low frequency vibrator arranged to move the protruding part of the probe, and the delivery of the transient, low frequency mechanical pulse may comprise:
  control, by the electronic unit, the low frequency vibrator to deliver to the body of the subject the transient, low frequency mechanical pulse.

By "transient pulse", it is meant a mechanical vibration that is temporary. The duration of the pulse, that is the active time, during which there is a substantial motion of the protruding part (induced by the vibrator in the case of a VCTE device) is followed by a downtime during which there is no or substantially no motion of the protruding part. By substantially no motion, it is meant for instance that, during this downtime, the displacement of the protruding part that may be induced by the vibrator remains smaller than 1/10 or even 1/20 of the peak displacement of protruding part. For the transient pulses mentioned above, an actuation ratio, equal to the pulse's active time, divided by the sum of this active time and the following down time, is typically below 50%, or even below 20%. The downtime is the duration between the end of the active time and a subsequent significant motion of the protruding part (corresponding for instance to a subsequent transient, mechanical pulse), should there be any.

By low frequency pulse, it is meant that the central frequency of the pulse is below 500 Hz, or even below 250 Hz. The central frequency of the pulse is, for instance, the average or the median frequency of the spectrum of the displacement or of the speed of displacement corresponding to that pulse, or the peak frequency of a main peak of this spectrum, or the mean of the −3 dB or −6 dB cutoff frequencies of the spectrum.

In one or more embodiments, when the elastography device is a VCTE device, a peak-to-peak amplitude of a displacement of the protruding part of the probe induced by the low frequency vibrator may be between 0.2 and 10 mm, for example between 0.5 and 2 mm.

In one or more embodiments, the region of the body may be a part of a liver of the subject, and a central frequency of the mechanical pulses induced in the region of the body may be between 10 Hz and 500 Hz.

Aspects of the invention are not limited to the characterization of the liver and may be extended to other parts of the body, for example the brain.

In one or several embodiments, the cardiac signal may be an electrocardiogram (ECG) signal, a photoplethysmography (PPG) signal, a cardiac signal obtained by ultrasound Doppler or a signal related to a blood pressure of the subject. The blood pressure of the subject may be for example a Central Venous Pressure, an intracardiac pressure or a pulmonary pressure. More generally, the cardiac signal may be any signal representative of the cardiac activity of the subject, and may be obtained by any system such as an ECG system, a pulse oximeter, a Doppler system or a pressure measurement system.

In one or several embodiments, the detection of an event related to the cardiac signal may correspond to a detection that the cardiac signal reaches a predefined threshold.

Indeed, the cardiac signals present a succession of upward and/or downward peaks, and the event may correspond to a peak of the curve, detected when the signal reaches a predefined threshold. For example, the detection of the event may correspond to a detection that a rising edge and/or a falling edge reaches a predefined threshold.

In one or several embodiments, the electronic unit may be further configured to determine the predefined threshold from a portion of the cardiac signal.

For example, the determination of the threshold may comprise:
 determining at least one value corresponding to a local extremum of the portion of the cardiac signal;
 determining a result of a function of a mean, a median, a maximum and/or a minimum of the at least one value, and
 defining the predefined threshold as a fraction of the result.

Thus, in these embodiments, the electronic unit is configured to detect a plurality of peaks in a portion of the cardiac signal, to determine for example an average height of the peaks, and to define the predefined threshold based on the average height of the peaks. For example, the threshold may be set to 90% of the average height of the peaks.

In one or several embodiments, the electronic unit may be further adapted to determine, from the plurality of measurements, a feature relating to the mechanical property.

For example, the feature may be a function of a maximum, a minimum, a mean, a standard deviation and/or a percentile of the measurements. More generally, the feature may be derived from any statistical parameter or combination of statistical parameters of the measurements.

In one or several embodiments, for each detection of an event related to the cardiac signal, at most one respective measurement is determined.

For example, each time an event is detected, a respective measurement may be determined (in other words, there is exactly one measurement determined each time an event is detected). However, it may happen that, upon detecting an event in the cardiac signal, the respective measurement of the mechanical property cannot be determined, for example because one or more conditions are not satisfied (for example, the probe is not well positioned or is not pressed sufficiently against the subject's body).

In one or more embodiments, each measurement of the plurality of measurements may be determined at a respective time called measurement time, which depends on a time at which a corresponding event related to the cardiac signal is detected.

For example, for each measurement of the plurality of measurements, the respective measurement time may correspond to a time at which the corresponding event related to the cardiac signal is detected delayed by a predefined temporal offset, the predefined temporal offset being identical for all measurements.

In these embodiments, each measurement is performed at a fixed time following the detection of the corresponding event. This makes it possible to determine measurements at the same moment in the cardiac cycle, over several cardiac cycles. The variability between the measurements is therefore reduced and the evaluation of a feature relating to the mechanical property is more accurate.

It is noted that the predefined temporal offset $\Delta t$ may be equal to zero or may be strictly positive. The predefined temporal offset may be set by the operator to determine the measurements at a specific moment of the cardiac cycle (for example, at a peak or in the middle of the cardiac cycle, etc.).

Alternatively, for each measurement, the respective measurement time may correspond to a time at which a corresponding event related to the cardiac signal is detected delayed by a temporal offset which varies over time. As detailed hereinafter, a variable temporal offset makes it possible to recover an estimate of the signal representative of the mechanical property, without the need to make measurements at a high rate (i.e. several measurements per second).

For example, the measurements may be a time series of measurements $E_1, \ldots, E_n$, n being a positive integer, and the temporal offset associated with the measurement $E_i$, i being an integer comprised between 1 and n, may be equal to of $\Delta t_i = (i-1) \times \alpha$, where $\alpha$ is a fixed predefined value and x designates a product. More generally, the temporal offset may be an increasing function of time.

In one or several embodiments, the electronic unit may be further adapted to determine, based on a portion of the cardiac signal, an estimate of an average duration $t_{cc}$ of a cardiac cycle of the subject. The fixed predefined value a may be function of the determined estimate of the average duration $t_{cc}$ of the cardiac cycle of the subject, for example a portion of the average duration $t_{cc}$ of the cardiac cycle of the subject. For example, the fixed predefined value a is less than $t_{cc}/4$.

In one or several embodiments, for determining the estimate of the average duration of the cardiac cycle of the subject, the electronic unit may be configured to:
 determine a plurality of times corresponding to peaks in a curve representative of the portion of the cardiac signal;
 determine, for several pairs of consecutive times determined, respective time intervals between the two times of the pairs, and
 determine the average duration of the cardiac cycle of the subject as a mean of the determined time intervals.

In one or several embodiments, the plurality of measurements may comprise at least one series of measurements, and each series of measurements may be determined upon detection of one respective event related to the cardiac signal.

In particular embodiments, the measurements of each series of measurements may be determined between two consecutive detections of events related to the cardiac signal, and each series of measurements may comprise at least 2 measurements.

In these embodiments, at least two measurements are performed per cardiac cycle.

Beneficially, each series of measurements may comprise at least 4 measurements, which makes it possible to observe the variations of the mechanical property over time, and more specifically during the cardiac cycle. A signal E(t) representative of the variations of the mechanical property over time may be obtained from the plurality of measurements, the signal being constructed from these measurements. This obtained signal E(t) takes into account the variations of the mechanical property over time, even during very short time intervals (of the order of a second). It is then possible to extract from this signal a feature (in particular a point feature) relating to the mechanical property, and this feature is generally more accurate than that obtained by conventional elastography techniques. For example, the median of the signal E(t) provides more accurate information than the median of 10 measurements taken at random and reflects more faithfully the real mechanical behavior of the part of the body considered.

In various embodiments, the electronic unit may be further configured to determine a repetition rate of the series of measurements from a portion of the cardiac signal, the determination comprising:
  determining, from the portion of the cardiac signal, an estimate of an average duration $t_{cc}$ of a cardiac cycle of the subject, and
  determining the repetition rate based on the estimate of the average duration $t_{cc}$ of the cardiac cycle of the subject.

By "repetition rate", it is meant a number of measurements performed per second.

For example, the determination of the estimate of the average duration of the cardiac cycle of the subject may comprise:
  determining a plurality of values corresponding to local extrema of the portion of the cardiac signal;
  determining, for each pair of consecutive extrema, a respective time interval between the two extrema of the pair of extrema, and
  determining the average duration of the cardiac cycle of the subject as a mean of the determined time intervals.

It is noted that on-the-fly determination of a LSM value several times per cardiac cycle requires on-the-fly processing of several corresponding series of echoes per second (since a cardiac cycle typically lasts about 1 second) and can therefore be a challenge from a computational point of view. To perform such processing, the electronic unit may for instance comprise two processors:
  a first, special purpose processor, such as an FPGA ("Field Programmable Gate Array"), for processing the echo signals acquired using a correlation technique, to determine tissue strain, or, more generally, a tissue motion parameter, (as a function of time and depth), and
  a second, general-purpose processor.

This architecture accelerates notably the processing of the echo signals, in particular because the (pre) processing achieved by the first processor reduces substantially (typically by a factor of 10, or even more) the quantity of data to be transmitted to the general-purpose processor, thus reducing the corresponding transmission time. And, in practice, this transmission time is often the most time limiting step of the overall processing of the echo signals.

Still, implementing the correlation technique in such a special purpose processor is challenging. Indeed, the displacement of the probe's tip or head is desirably compensated before correlating the echo signals with each other, and the usual techniques to compensate for this displacement (based on strong echo detection, and Fourier-domain compensation) are very challenging. To achieve such a displacement compensation, the ultrasound pulses emission and/or reception times may for instance be pre-compensated (upon emission and/or reception), depending on the probe's tip or head displacement.

Therefore, in one or more embodiments in which the elastography device comprises a low frequency vibrator, the electronic unit may be further configured to generate, for one or more of the ultrasound pulses emitted:
  a temporal offset upon emission $\delta t_{TX}$, by which the emission of an ultrasound pulse is shifted; and/or
  a temporal offset upon reception $\delta t_{RX}$, by which an echo signal, acquired in response to the emitted ultrasound pulse, is shifted;
so as to compensate for a temporal shift of the echo signal with respect to other echo signals acquired, caused by a displacement of the ultrasound transducer occurring during the sequence of ultrasound pulses;
the temporal offset upon emission $\delta t_{TX}$ and/or the temporal offset upon reception $\delta t_{RX}$ being adjusted so that a difference thereof is equal to $2 \cdot d/v_{us} + C$, where d is a displacement of the probe with respect to a reference position, $v_{us}$ is a speed of ultrasound in the region of the body, and C is a constant.

In one or several embodiments, the electronic unit may be further adapted to obtain a breath holding indicator indicating whether the subject is holding his breath or not. Indeed, as detailed hereinafter, when the subject is breathing, the stiffness signal is very noisy. On the other hand, when the subject is holding his breath, a large part of the noise disappears and the variations of the signal E(t) are more visible, in particular the variations linked to the cardiac cycle. The signals obtained are therefore not necessarily analyzed and used in the same way depending on whether they are obtained while the subject is breathing or holding his breath.

Also, it may be desirable to be able to automatically determine when the subject is breathing or not (which means in practice that the studied medium is unstable or stable), in order to, for example, take the measurements only when the subject holds his breath, or to determine and analyze a portion of the signal during which the patient holds his breath.

By "obtain", it is meant "receive or determine". For example, the breath holding indicator may be determined by an external device (for example a breath monitoring device or any device comprising a breath sensor—or "respiration sensor") and sent to the electronic unit—which therefore receives the breath holding indicator.

Alternatively, the beath holding indicator may be determined by the electronic unit itself.

For example, the breath holding indicator may be determined by the electronic unit by emitting successive ultrasound signals, receiving respective echo signals in response to the emission of the ultrasound signals, and computing a correlation coefficient between successive echo signals among the received echo signals received, and comparing the computed correlation coefficient to a predefined threshold. The predefined threshold may be set to any value greater than 0.5, depending on the desired precision of the indicator.

For example, the predefined value may be set to 0.8 or to a higher value, for example 0.9, 0.95 or 0.99.

The ultrasound signals emitted to determine the breath holding indicator may be different ultrasound signals than those of the sequences of ultrasound pulses used to track how the low frequency elastic waves induced by the mechanical pulses propagate through the region of the body of the subject.

In some embodiments, the measurements may be determined only if or when the breath holding indicator indicates that subject is holding his breath.

For example, when the elastography device comprises a low frequency vibrator, the electronic unit may be adapted to control the low frequency vibrator to trigger the delivery of the plurality of mechanical pulses when the breath holding indicator indicates that subject is holding his breath.

In such embodiments, the electronic unit may be further adapted to determine, from the measurements of the mechanical property, information relating to a blood pressure of the subject. For example, information relating to a central venous pressure of the subject may be determined from the measurements.

As detailed below, when the subject is holding his breath, the obtained signal presents periodic or pseudo-periodic variations linked to the variations of the Central Venous Pressure (CVP), which can be analyzed to determine an information relating to the CVP of the subject.

For example, the mechanical property may be a liver stiffness and the information relating to the blood pressure of the subject may be a value representative of a central venous pressure of the subject.

For example, the value representative of the blood pressure of the subject is an "equivalent blood pressure value" determined based on a value of the mechanical property. In case the mechanical property is a liver stiffness, the equivalent blood pressure value may be determined by a formula provided in Taniguchi et al., Am. J. Cardiol., 2014, 113 (3): p. 552-8.

In various embodiments, the electronic unit may be further adapted to emit, based on the determined information, an alert related to a possible cardiovascular pathology of the subject.

Such alert may be emitted, for example, when a value representative of the blood pressure of the subject is under or below a threshold (i.e. past a threshold).

In one or several embodiments, the electronic unit may be further configured to obtain, from the plurality of measurements, a signal representative of variations of the mechanical property with time, the elastography device being configured to control a display device to jointly display a curve representative of at least a portion of the obtained signal representative of variations of the mechanical property with time and a curve representative of at least a portion of the cardiac signal.

In these embodiments, a synchronization between the two signals may be performed to compensate the delay between an event and a respective measurement, the delay being due to acquisition and processing time to determine the measurement for example.

Displaying these two curves has informational value for the medical practitioner, who can interpret one curve in the light of the other curve.

Another aspect of the invention relates to a method, implemented by an elastography device, comprising:

receiving a cardiac signal related to a cardiac activity of a subject, and determining a plurality of measurements of a mechanical property of a region of a body of the subject;

wherein at least one measurement of the mechanical property among the plurality of measurements of the mechanical property is determined upon detection of an event related to the cardiac signal.

In an aspect of the invention, there is also provided a method comprising positioning a probe of an elastography device to face a patient's liver so as to acquire one or more liver stiffness measurements, and monitoring a cardiac function of the patient's heart using the acquired one or more liver stiffness measurements or using both the acquired one or more liver stiffness measurements and an acquired cardiac signal of the patient's heart.

In an embodiment, the method further comprises observing a variation of the one or more liver stiffness measurements as a function of time on a patient monitoring device that simultaneously displays the one or more liver stiffness measurements and the acquired cardiac signal of the patient's heart. In yet another embodiment, the method further comprises determining a cardiovascular pathology of the patient using the acquired one or more liver stiffness measurements or using both the acquired one or more liver stiffness measurements and the acquired cardiac signal of the patient's heart.

Other features and benefits of the method and apparatus disclosed herein will become apparent from the following description of non-limiting embodiments, with reference to the appended drawings.

BRIEF DESCRIPTION OF THE DRAWINGS

Aspects of the present invention are illustrated by way of example, and not by way of limitation, in the figures of the accompanying drawings, in which like reference numerals refer to similar elements and in which.

DETAILED DESCRIPTION

It is known that liver pathologies can have repercussions on the spleen. For instance, liver cirrhosis leads to portal hypertension, which corresponds to a significant increase in pressure in the portal vein, and which results in an increase in the Spleen Stiffness Measurement (SSM).

Likewise, since the blood circulates from the liver to the heart via the hepatic vein and the inferior cava vena, heart pathologies may have repercussions on the liver. For example, severe heart failure causes blood to flow back from the heart into the inferior vena cava. This congestion increases pressure in the inferior vena cava, and when this pressure is too high, the liver becomes engorged (congested) with blood, which results in an increase of the Liver Stiffness Measurement (LSM).

Figure 1:
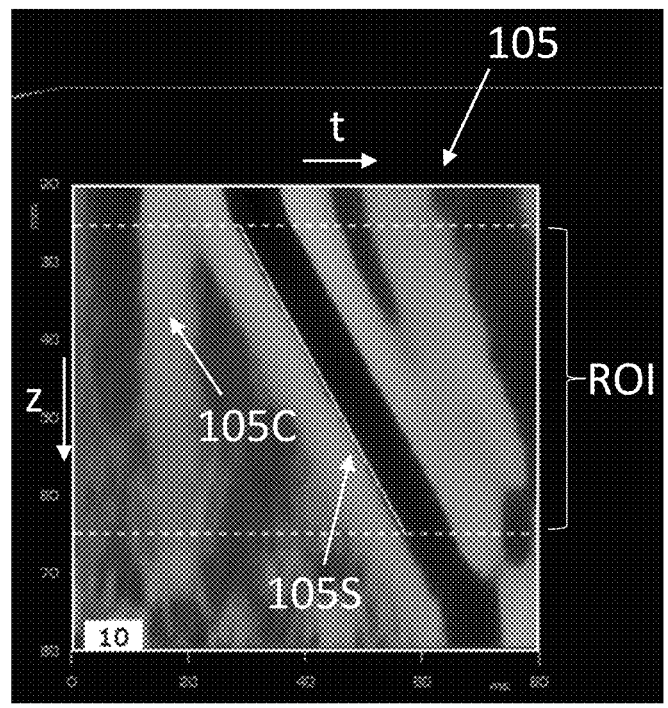
FIG. 1 represents an example of an elastogram.

In particular, the measurement of the Right Atrial Pressure (RAP), i.e. the measurement of the blood pressure in the right atrium of the heart using an invasive catheter, and the LSM are strongly correlated. More specifically, the values of LSM have been measured by using a transient elastography device as in FIG. 1 for a set of patients with heart failure without structural liver diseases. Measurements of RAP were also obtained for the same patients by using right-sided cardiac catheterization, which is the reference method for assessing RAP of a subject. An excellent correlation has been found between these two parameters (p<0.0001).

Moreover, RAP measurement of a subject fluctuates as a function of time during the cardiac cycle.

Figure 2:
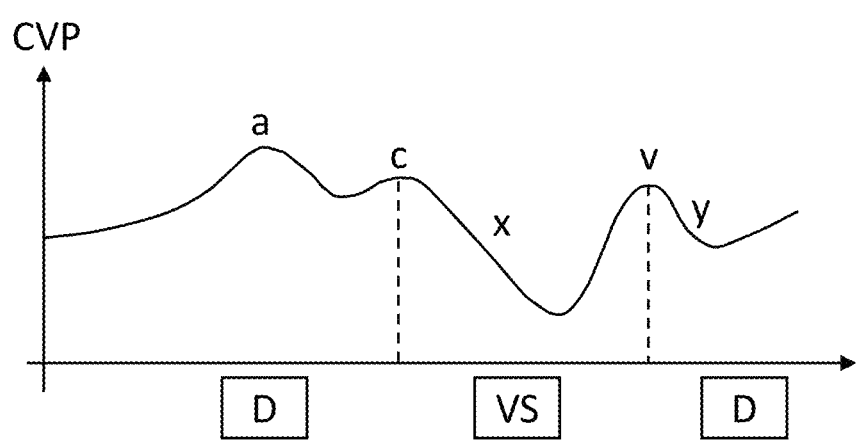
FIG. 2 represents a typical curve representative of variations of the Central Venous Pressure during a cardiac cycle.

More specifically, the curve representing variations of the Central Venous Pressure (CVP) of a subject, which is a measure of pressure in the vena cava of the subject, during a cardiac cycle is a waveform containing five components: three peaks (a, c, v) and two descents (x, y), each component corresponding to a specific moment or instant of the cardiac cycle. An example of such CVP waveform is represented in FIG. 2. In FIG. 2, "D" means "Diastole" and "VS" means "Ventricular Systole". At the end of a diastole, a peak called "a-wave" corresponds to an increase in pressure due to atrial contraction. Shortly after a-wave, a second peak called "c-wave" and representing early ventricular systole is observed, and corresponds to an increase in pressure due to tricuspid valve elevation into the right atrium. Following the c-wave, a significant descent in the CVP waveform is observed and is called "x-descent". The x-descent corresponds to a drop in atrial pressure during ventricular systole induced by atrial relaxation. At the end of ventricular systole, after the x-descent, the CVP value rises to a new peak called "v-wave". This rise corresponds to the filling of the atrium. Finally, at the beginning of the next diastole, a new drop in atrial pressure, called "y-descent", is observed and is caused by an entry of the blood into the ventricle.

The variation of RAP of a subject over multiple cardiac cycles can be measured and it is found that the five components (the three peaks and the two descents recalled above) observed in the CVP signal are also observed in the RAP signal.

The inventors of the present invention have devised that it is possible to observe variations of LSM due to the cardiac cycle and in particular to observe the components of the CVP waveform directly in the LSM.

This finding is far from trivial. Indeed, it was previously believed that there is a correlation between "static" measurements of RAP and "static" measurements of LSM. By "static" it is meant that each measurement is obtained at a respective specific time or is derived from measurements obtained at respective different times. Such static measurements therefore correspond to characteristic values (for example, isolated values or average values) of the RAP and LSM signals but does not reflect the variations of these signals over time, in particular during the cardiac cycle. In fact, the inventors have devised that variations of RAP and LSM signals exist over the cardiac cycle. The finding that LSM could vary as a function of time was not at all anticipated or suggested.

In one or more embodiments, the inventors have determined the behavior of LSM during several cardiac cycles, from a plurality of measurements taken per cardiac cycle. Knowing that a cardiac cycle typically has a duration of the order of a second, in one or more embodiments, and on the same subject, several LSM measurements are carried out per second and a representation of the variation of the LSM over several heart cycles is obtained.

On the first experiments carried out by the inventors, it was noticed that the measurements obtained were very noisy, which makes interpretation the resulting signal difficult. The series of measurements were subsequently carried out over several cardiac cycles (in practice, over several seconds), by asking the subjects to hold their breath during the measurements. The results thus obtained are shown in FIG. 3.

Figure 3:
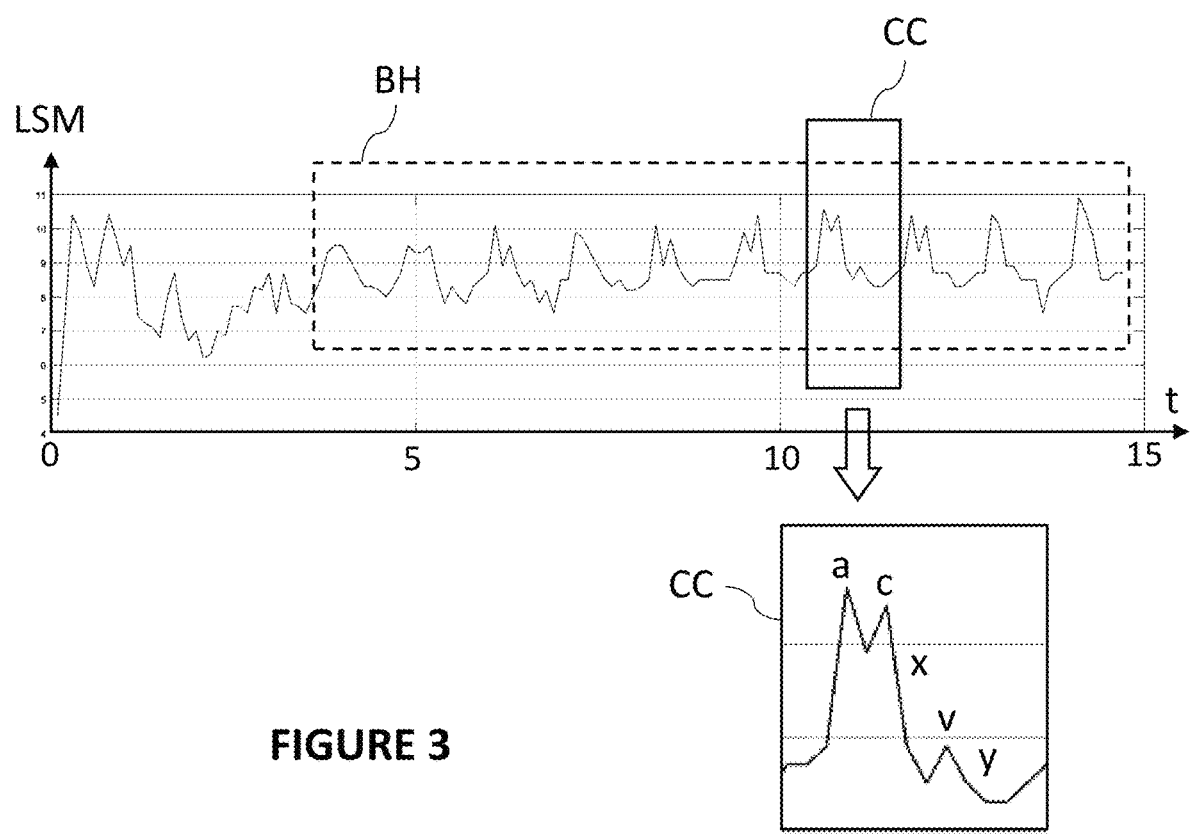
FIG. 3 represents an example of a curve representative of variations of the Liver Stiffness over time.

FIG. 3 depicts an experimental curve of variation of LSM (expressed in kPa) of a subject as a function of time t (expressed in seconds). To obtain this curve, LSM values of the subject were measured 10 times per second (i.e. at a repetition rate of 10 Hz, meaning 10 LSM per second) during 15 seconds. Between t=4 s and t=15 s (corresponding to the time interval denoted "BH" in FIG. 3), the subject was asked to hold his breath. As can be seen in FIG. 3, before the subject holds his breath, the signal is very noisy. Once the subject begins holding his breath, the signal becomes less noisy, and after a few seconds (around t=8 s on FIG. 3) a pattern appears that recurs regularly. This pattern, as particularly noticed on the one noted "CC" in FIG. 5, has a duration of approximately 1 second and has the same general shape as the CVP represented in FIG. 2. More specifically, pattern CC presents three peaks and two descents, which correspond to the a-, c- and v-waves and the x- and y-descents of the CVP.

To confirm this hypothesis, the subject's heart rate was monitored, while measuring the LSM values of the subject. Such monitoring may be performed by using, for example (the list below is not limiting):

An electronic system such as a system that provides an electrocardiogram (ECG);
An optical system such as with a pulse oximeter;
An ultrasound system such as Doppler; or
A pressure measurement system using a catheterization device.

By synchronizing the measurement of LSM to the cardiac cycle of the subject, the inventors found that the patterns indeed coincided with the subject's different cardiac cycles.

In other words, the inventors discovered that it was possible to recover the CVP signal (or at least certain characteristics of the CVP signal) in the LSM signal.

This result was unexpected. Indeed, insofar as it was thought that a correlation between mean values of LSM and mean values of CVP might be expected, it was thought that such a correlation would, at best, only concern static values, as detailed above, and it was unexpected to observe a correlation between dynamic signals (i.e. to retrieve the characteristic temporal variations of the CVP signal in the LSM signal). This is because, the dynamic properties of liver stiffness are ignored. It was therefore unexpected that the mechanical response time of the liver was fast enough to mimic variations of cardiac signals. Furthermore, it was unexpected that variations due to the heart pump could travel backward to the liver and induce variations in LSM.

To the inventor's knowledge, no publication has shown such an effect on liver stiffness. In addition, as it can be seen in FIG. 3 the LSM signal is very noisy and precautions should be taken to observe the variations of the CVP in the LSM signal (before the subject holds his breath, the characteristic variations of the CVP signal are drowned in noise and are not found in the LSM signal).

In addition, in order to determine LSM measurements at high repetition rate (e.g. at least 4 measurements per second), the device for acquiring the LSM may be adapted to be able to process the signals at the desired repetition frequency (several measurements per second).

From the experimentations carried out, it appears that the influence of the cardiac cycle on LSM variability is high and that implications of the cardiac cycle on LSM are numerous.

Contrary to what one might think, LSM is not constant over time even when the patient is stable and is holding his breath. Indeed, even when the patient is stable and is holding his breath, the variations in the LSM can reach up to 3 kPa. Three kPa is a significant variation considering that a patient is considered low-risk when LSM<8 kPa, intermediate risk when 8 kPa≤LSM<12 kPa and high-risk when LSM≥12 kPa (see European Association for the Study of the Liver. EASL Clinical Practice Guidelines on non-invasive tests for evaluation of liver disease severity and prognosis—2021 update. J Hepatol, vol. 75, no 3, p. 659-689). Therefore, as will be appreciated by the person skilled in the art, a 3 kPa can easily and significantly distort the LSM results and diagnosis, and indicate a significant change in the patient risk stratification. As a result, the patient may be asked to perform additional examinations which are not in fact necessary. As an example, the patient could be referred for a confirmatory test such as a liver biopsy which is invasive and painful. Thus, the fact of determining discrete measurements (e.g. triggered by an operator) and of extracting a single indicator of the liver stiffness from these measurements does not make it possible to fully take the intrinsic variability of LSM into account, and necessarily induces a loss of information that may have a strong preventive or diagnostic value. Consequently, to have precise information concerning the state of the liver, it is desirable to change paradigm compared to what has been done until now, and to consider elasticity of the liver as a function of time. In other words, there is a need for a change in paradigm to consider LSM not as static measurements, as it is the case in the devices of the prior art, but rather as a signal varying over time.

Figure 4:
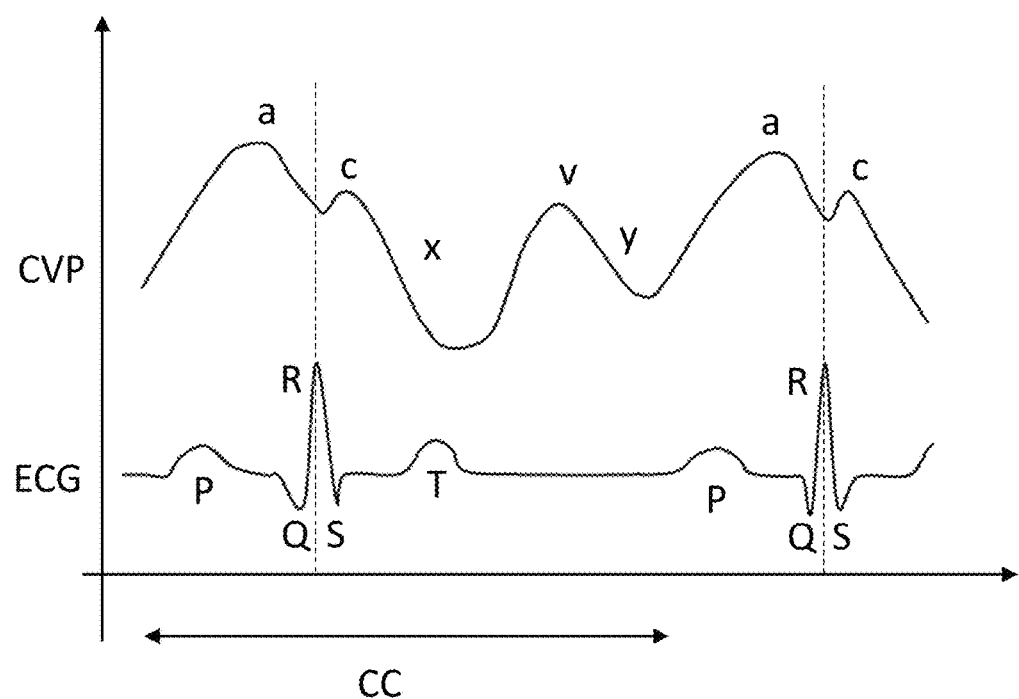
FIG. 4 represents typical curves representative of variations of the Central Venous Pressure and the Electrocardiogram signal of a subject.

Furthermore, Central Venous Pressure (CVP) and Electrocardiogram (ECG) signals are known to be linked, as shown in FIG. 4. In FIG. 4, the top curve represents an example of a CVP signal measured on a subject and the bottom curve represents an example of an ECG signal measured on the same subject during a same time interval. The curves of FIG. 4 typically represent typical CVP and ECG curves, for example CVP and ECG curves of a healthy subject with no cardiac pathology (for example, it is known that presence of infarction may distort the Q wave).

During one cardiac cycle (noted "CC" on FIG. 4), an ECG curve typically comprises three main components, as represented in FIG. 4: the P wave, which represents the depolarization of the atria, the QRS complex, which comprises three waves Q, R and S, and represents the depolarization of the ventricles, and the T wave, which represents the repolarization of the ventricles.

As can be seen in FIG. 4, an upward peak of the R wave of the ECG approximatively coincides with the beginning of a c-wave of the CVP signal (i.e. with the dip between the a-wave and the c-wave). In other words, CVP and ECG signals are (at least approximatively) synchronized.

From all the above, the inventors deduced that the LSM signal and the ECG signal of a subject were probably correlated. The inventors studied the possibilities offered by an elastography device configured for receiving an ECG signal (or any signal related to cardiac activity, obtained by any other means than ECG, such as an optical system, an ultrasound system or a pressure measurement system as mentioned above) and for determining measurements of a mechanical property of a region of the body (for example, liver stiffness) of a subject based on the received ECG signal. An example of such a device is represented in FIG. 5.

Figure 5:
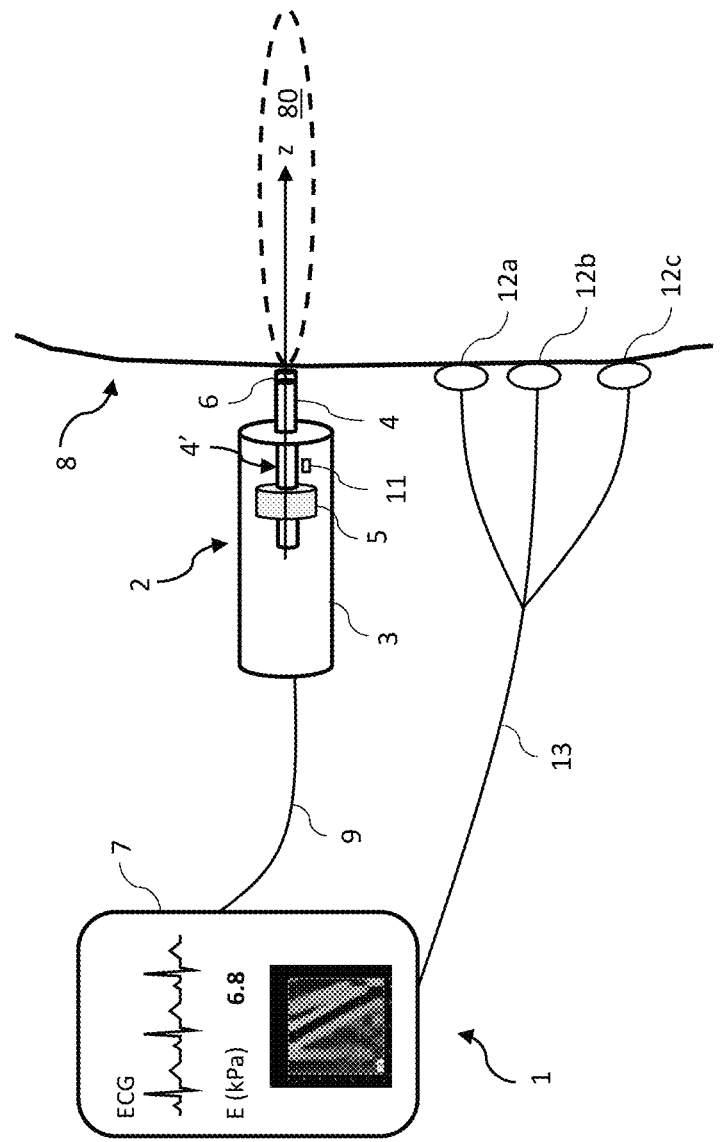
FIG. 5 schematically represents an elastography device according to an embodiment of the invention.

FIG. 5 represents an example of an elastography device according to one or several embodiments of the invention.

In the elastography device 1 represented in FIG. 5, measurements of the mechanical property are obtained by using a Vibration-Controlled-Transient-Elastography (VCTE) technology. However, it is noted that the present invention can apply to other elastography techniques, including elastography techniques in which shear wave can be generated by other means. For example, the invention is compatible with shear wave generation using acoustic radiation force. Acoustic radiation force is a technique in which the shear wave is generated using long burst (several tens of microseconds) of ultrasound signals. It does not require the use of a vibrator located in the probe.

Also, even if the elastography device 1 represented in FIG. 5 is configured to obtain an ECG signal of the subject, it is noted that the invention can apply to any other signal relating to the cardiac activity of the subject (obtained by any means, as mentioned above).

The mechanical property may be, in an embodiment, a tissue stiffness and the region of the body may be a region of the liver, but the invention is not limited to this embodiment. For example, an aspect of the present invention can be applied to determining the spleen stiffness or the brain stiffness. As a matter of fact, the brain is a large and soft tissue. Similarly to the liver, the blood flows through the brain, in this case into the superior (and not inferior like in the case of the liver) cava vein before entering the heart. Therefore, it is very likely that the brain stiffness be a surrogate of central venous pressure and right atrium pressure.

In an embodiment, the elastography device 1 of FIG. 5 comprises a probe 2 including a probe casing 3 (which forms the main body of the probe), to be handheld, and a protruding part, which protrudes from the casing 3. The protruding part can be applied against the body 8 of the subject, to deliver mechanical pulses to it, and to transmit and acquire ultrasound (U/S) shots. In this embodiment, the protruding part is a tip 4, for instance a cylindrical tip (with a circular transducer 6 at its end).

Still, in other embodiments, the protruding part could be an ultrasound head (located at an end of the probe) including an array, for instance a linear array of U/S transducers. In this regard, it may be noted that the proposed technique can be used with a single element ultrasound transducer (like in the case of FIG. 5, which can be of various shapes: rectangular or ellipsoidal or circular for example), or with a multi-element ultrasound transducer (like an array of U/S transducers, for example a linear or convex or phased array ultrasound probe). While a single element ultrasound transducer is adapted to display A-mode and M-mode ultrasound imaging, a multi element ultrasound transducer can also display a B-mode image allowing an easier localization of the to-be-measured tissue. In the case of a multi element ultrasound transducer, at least one of the beamformed ultrasound lines is used to track how the mechanical pulses propagate. To this end, using the center beamformed ultrasound line (which is aligned with the probe axis) is beneficial, for symmetry considerations.

The probe 2 comprises also a low frequency vibrator 5, and the U/S (ultrasound) transducer 6, which is fixed at an end of a tip 4. Here, the U/S transducer 6, plays both the role of an ultrasound emitter and the role of an ultrasound receiver (alternatively). Still, in other embodiments, the probe may comprise an U/S emitter and an U/S receiver distinct from each other. Here, the U/S transducer 6 is arranged on the axis z of the vibrator. Still, in other embodiments, the U/S transducer could be located elsewhere on the probe, not necessarily on the vibrator's axis.

The tip 4 is actuated by the low frequency vibrator 5. Here, the vibrator 5 is arranged to move the tip 4 relative to the probe casing 3. The vibrator 5 is arranged to move a shaft 4', the end of which forms the tip 4 of the probe. Still, in other embodiments, the tip, or, more generally, the protruding part of the probe, could be bound to the probe casing with no motion with respect to the probe casing, the vibrator being then arranged to move a mass, inside the casing, to make the whole probe moving towards the tissue and back (by virtue of a recoil effect).

The vibrator 5 is a low frequency vibrator in that it moves the tip with a central, average frequency smaller than 500 hertz, or even smaller than 100 hertz (in contrast with ultrasound shots or echo signals, whose central frequency is typically higher than 1 megahertz, for instance between 1 and 5 megahertz). The vibrator is a low-frequency electromechanical actuator, for instance with one or several coils and magnets, like a loud-speaker actuator.

In this device 1, the vibrator 5 is rotationally symmetrical around a vibrator axis, which coincide with the probe axis z. When the vibrator 5 vibrates, it induces displacements that are mainly longitudinal, parallel to its axis. The shaft 4' is centered onto the axis z, and the vibrator 5 is arranged to move this shaft along the axis z.

In practice, the displacement of the ultrasound transducer 6, induced by the vibrator 5, has a peak-to-peak amplitude between 0.2 mm and 10 mm, and, in an embodiment, between 0.5 and 2 mm.

The probe 2 comprises a displacement sensor 11, arranged to output a measurement signal Sd representative of the displacement of the ultrasound transducer 6. In this embodiment, the measurement signal Sd is representative of the displacement of the ultrasound transducer 6 relative to the probe casing 3. A part of the displacement sensor 11 is fixed on the shaft mentioned above while another part of the sensor is fitted in the probe, with no motion with respect to the casing 3. The displacement sensor 11 may be a Hall-effect sensor, an induction displacement sensor, or any other suitable sensor.

In one or several embodiments, the device 1 may further comprise a plurality of electrodes 12a, 12b, 12c to be placed on different parts of the body of the subject to record the heart's electrical activity and obtain an electrocardiogram of the subject. In FIG. 5, the device 1 comprises 3 electrodes 12a, 12b, 12c for illustration purpose only, and the number of electrodes may be different from 3. For example, the number of electrodes may be equal to 2 or may be greater than 3. In the specific embodiment of 12-lead ECG, the number of electrodes 12a, 12b, 12c may be equal to 10, including 6 electrodes to be placed on the subject's thoracic cavity to obtain precordial leads and 4 electrodes to be placed on the four limbs (arms and legs) of the subject to obtain the peripheral leads.

It is noted that, alternatively, electrodes 12a, 12b, 12c may not be part of the device 1, but may be connected to the device 1, for example via one or several wires, so that the device 1 may receive signal(s) related to the cardiac activity of the heart. The device 1 may, for example, receive the electrical signals detected by the electrodes and process these signals to obtain the ECG signal of the subject, or, alternatively, directly receive the ECG signal of the subject.

Figure 6:
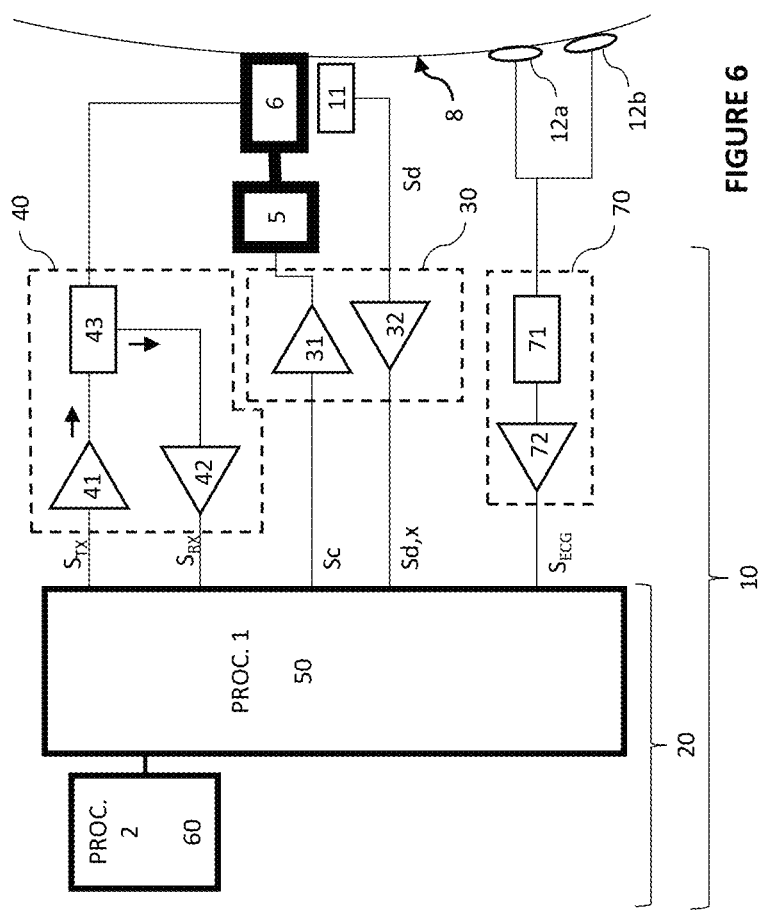
FIG. 6 schematically represents some elements of an electronic unit of the elastography device of FIG. 5 according to one or more embodiments of the invention.

The device 1 comprises also an electronic unit 10, which may be connected to the vibrator 5, to the U/S transducer 6 and to the electrodes 12a, 12b, 12c. A block diagram of an embodiment of the electronic unit 10 is represented in FIG. 6. The electronic unit 10 includes several electronic components and/or electronic circuitries to carry out its functions. The electronic unit 10 of FIG. 6 comprises a control and processing module 20, an ultrasound front end 40, a motion controller 30 to control the vibrator 5 and an ECG receiver 70 to receive and process data obtained from electrodes (for the sake of simplicity, only two electrodes 12a, 12b are represented in FIG. 6, but the number of electrodes may be greater than 2). The electronic unit 10 may be a computer connected to the vibrator 5, to the U/S transducer 6 and to the electrodes 12a, 12b.

The ultrasound front end 40, the motion controller 30 and the ECG receiver 70 are all connected to the control and processing module 20 (that is to say, they can receive instructions or control signals from the control and processing module 20 or send data or measurement signals to it). The electronic unit 10 also comprises a signal conditioning module 32, to condition and digitalize the measurement signal Sd outputted by the displacement sensor 11. This signal conditioning module 32 is part of the motion controller 30.

The motion controller 30 comprises also an amplifier 31, to drive the vibrator 5. The amplifier 31 is configured to convert a control signal Sc into a form suitable to drive the vibrator, from an electrical point of view. The amplifier 31 may thus be a current amplifier or a power amplifier (such as the LM3886 power amplifier by Texas Instrument, for instance), for instance.

The ultrasound front end 40 comprises an ultrasound (U/S) pulser 41, an U/S receiver module 42 and a switch 43 for alternatively transmitting and receiving ultrasonic signals. The U/S pulser 41 comprises an electric circuit configured to generate an electric ultrasonic signal appropriate to drive the U/S transducer 6, based on a transmission control signal $S_{TX}$ outputted by the control and processing module 20. The U/S receiver module 42 comprises an electric circuit configured to acquire an electric ultrasonic signal (an echo signal), previously received by the U/S transducer 6 (and transmitted to the U/S receiver module 42 via the switch 43), and to transmit the corresponding (digitalized) U/S reception signal $S_{R,X}$ to the control and processing module 20. The electric circuit of the ultrasonic receiver module 42 may comprise a voltage amplifier, one or more filters and an analog to digital converter (ADC), for instance an 8 to 16 bits ADC with a 10 to 100 Mega-sample per second rate.

The ECG receiver 70 may comprise a heart rate monitoring module 71 configured to acquire and process cardiac data from the electrodes 12a, 12b. The heart rate monitoring module 71 may include an electric circuit configured to receive cardiac data from electrodes 12a, 12b and to extract an electric biopotential signal from the cardiac data, a biopotential amplifier for amplifying the electric biopotential signal, and a circuit for filtering the amplified electric biopotential signal (for example, to remove noise from amplified signal). For example, the heart rate monitoring module 71 may be a heart rate monitor front end, such as an AD8232 type component. The amplified and filtered electric biopotential signal outputted by the heart rate monitoring module 71 is typically an analog signal. Therefore, the ECG receiver 70 may also comprise an ECG receiving module 72 including an ADC to convert the electric biopotential signal outputted by the heart rate monitoring module 71 into an ECG digital signal $S_{ECG}$. The ECG receiving module 72 may also be configured to transmit the digitalized ECG signal $S_{ECG}$ to the control and processing module 20.

It is noted that in the example of FIG. 6, the ECG receiver 70 is a module of the electronic unit 10. However, in alternative embodiments, the ECG receiver 70 may be external to the device 1.

The control and processing module 20 is a device or system comprising electric circuitry for processing data, such as a microprocessor coupled to a non-volatile non-transitory memory comprising machine executable instructions and/or a programmable microcircuit like an FPGA or another programmable circuit. The control and processing module 20 may also comprise one or several RAM memories or registers. In the embodiment of FIG. 6, the control and processing module 20 comprises at least one two processors 50, 60 and at least one memory. The memory may be coded with machine readable instructions for carrying out function(s) of the electronic unit 10.

Figure 7:
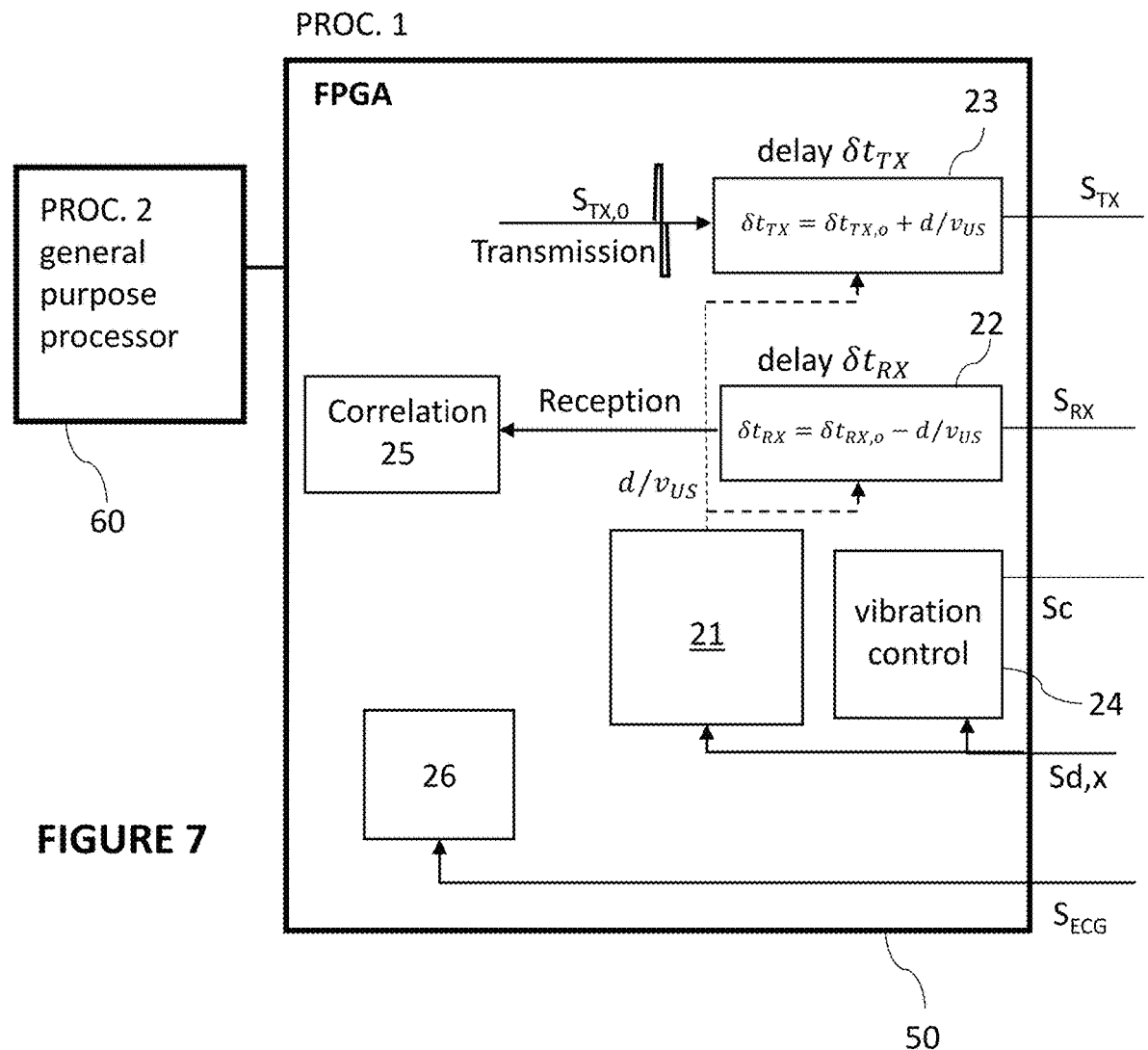
FIG. 7 schematically represents in more detail a control and processing module of the electronic unit of the elastography device of FIG. 5 according to one or more embodiments of the invention.

Some sub-modules of the control and processing module 20, which are adapted to implement a technique of pre-compensation of the transducer's displacement, are represented in more details in FIG. 7. In an embodiment, the pre-compensation is typically performed in a programmable microcircuit, such as an FPGA, so that the pre-compensation is performed on-the-fly.

Some of the elements of electronic unit or circuit 10 (such as the signal conditioning module 32, for instance) can be housed in the probe 2 while other elements of electronic unit 10 (such as general-purpose processor 60) may be remote. Alternatively, the entire electronic unit 10 could be housed in probe 2, or, on the contrary, it could be entirely located outside the probe. The electronic circuit includes various electronic components to carry out its functions.

Referring back to FIG. 5, probe 2 is operatively connected to a central unit 7, which has the structure of a computer (and that could be a laptop, a smartphone, or a dedicated electronic device arranged to control and to interface the probe, and to process the signals acquired). The central unit comprises at least a memory and a processor. The at least one memory is coded with machine readable instructions for carrying out function(s) of the central unit 7 when executed by the processor.

In the embodiment of FIG. 5, the central unit 7 comprises also a user interface, such as a touch screen. The central unit 7 may also comprise a display for displaying one or more pieces of information, such as, for example, one or several elastograms, the curve representing variations of the ECG signal of the subject with time, one or more features related to the mechanical property, or other pieces of information. However, this is not limiting, the central unit 7 and display can be adapted to display additional pieces of information.

The probe may be connected to the central unit 7 by a connection cable 9, or by a wireless link. Similarly, the electrodes 12a, 12b, 12c may be connected to the central unit 7 by a connection cable 13 or by a wireless link. In the embodiment of FIG. 5, some elements of electronic unit 10 (in particular the general-purpose processor 60) are part of central unit 7.

Figure 8:
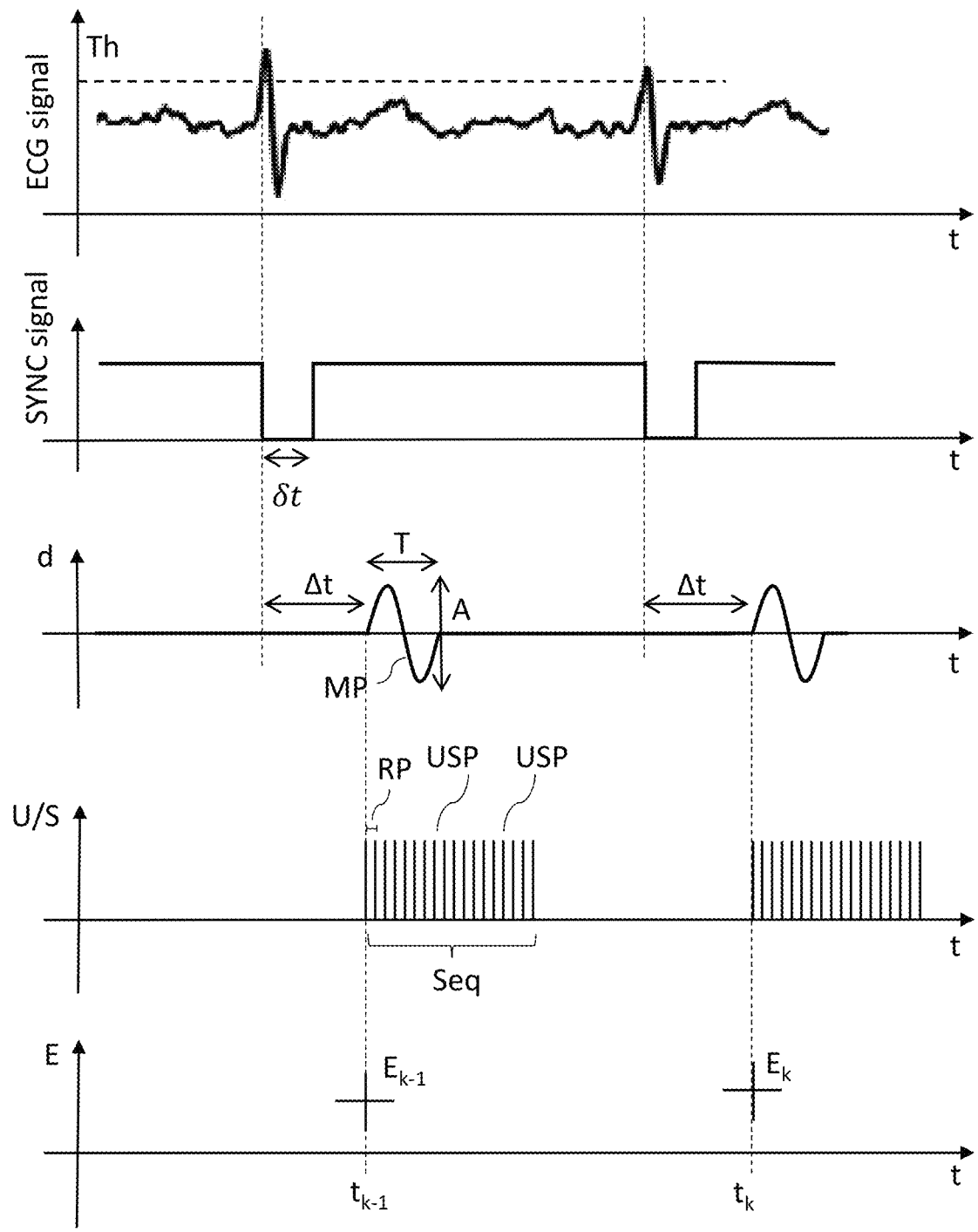
FIG. 8 represents a sequence of mechanical and ultrasound pulses emitted by the elastography device of FIG. 5 upon detecting an event related to an Electrocardiogram signal according to one or more embodiments of the invention.

Electronic unit 10 (more specifically, its control and processing module 20, here) is configured (for instance, programmed via instruction stored in a memory) to control electronic device 1 so that it operates to perform (or "determine") a plurality of measurements of the mechanical property of the region 80 of the body. According to one or more embodiments of the invention, at least one measurement of the plurality of measurements is determined based on an event related to the ECG signal. Therefore, electronic unit 10 (more specifically, its control and processing module 20, here) is further configured to detect such an event based on the received ECG signal $S_{ECG}$. For example, the event may correspond to a specific feature in the ECG signal, such as an upward peak in the ECG curve (which corresponds to the top of the R wave), as represented in FIG. 8 (top graph). However, this is not limiting and other embodiments are possible. For example, the event may correspond to a downward peak in the ECG curve. At least one corresponding measurement of the mechanical property is determined when an event related to the ECG signal is detected, as detailed hereinafter. For this purpose, control and processing module 20 is adapted to emit a synchronization signal as shown in FIG. 8 (first two graphs). For example, the synchronization signal may be a signal with downward peaks—or "windows" (as in the example shown on the "SYNC signal" graph in FIG. 8) or upward peaks. The peaks can be synchronization pulses in the form of rectangular signals, of a predefined duration δt (for example of the order of a few us or a few ms). One peak corresponds to one respective detection of an event (for example, when a rising edge or a falling edge of the ECG signal reaches a predetermined threshold value). For example, each time a rising edge of the ECG signal reaches the predetermined threshold value Th, a corresponding peak in the synchronization signal may be emitted. According to one or more embodiments of the invention, at least one measurement of the mechanical property is determined upon detecting a peak in the synchronization signal. Beneficially, the measurement is determined automatically upon detection of the corresponding peak in the synchronization signal (or, equivalently, upon detection of the corresponding predefined event in the ECG signal). By "automatically", it is meant that the determination of the measurement is not triggered by an operator (for example, it is not the operator who actuates a button to take the measurement).

It is noted that in one or several embodiments, the operator can activate a measurement mode of the device 1 by a manual trigger. By "activate a measurement mode", it is meant that, in response to the manual trigger of the operator, the device 1 becomes ready to take measurements of the mechanical property. For example, when the measurement mode is activated, the determination of the measurement can be performed automatically when a peak in the synchronization signal is detected. It will therefore be appreciated that the determination of the measurement based on the detection of the peak in the synchronization signal is still automatic (even if the activation of the measurement mode can be manual). The manual activation of the measurement mode may be achieved, for example, by actuating a push-button switch arranged on the probe casing 3, or else by actuating a foot-switch. Thus, when the operator determines, based on one or more conditions, that the acquisition of the series of measurements can begin, the operator activates the measurement mode. Once device 1 has entered the measurement mode, a plurality of measurements of the mechanical property of the probed region, related to low frequency elastic wave propagation (for instance its Young modulus), can then be determined. At least one measurement among the plurality of measurement is determined based on an event related to the ECG signal—for example upon detection of a peak in the synchronization signal detailed above.

The one or more conditions on the basis of which the operator activates the measurement mode may include, for example, a condition related to the fact that the position and direction of the probe 2 is adequate (as detailed for instance in U.S. patent application Ser. No. 17/695,053 assigned to the applicant and which is incorporated herein by reference in its entirety) and/or a condition related to the fact that tip 4 is applied against body 8 of the subject (for example, based on contact force level measured by a force sensor-like a strain gauge—or deduced from the position of shaft 4' pushed into the casing when the tip is pressed on the subject's body) and/or a condition related to the fact that the subject is holding his breath (as detailed later in the description).

In alternative embodiments, device 1 may automatically enter the measurement mode, for example when all required conditions are satisfied. For example, electronic unit 10 may be configured to determine whether the position and direction of probe 2 are adequate and/or whether tip 4 is applied against body 8 of the subject and/or whether the subject is holding his breath. If one or more of these conditions are satisfied, electronic unit 10 may enter the measurement mode (and determine one measurement when the event related to the ECG signal is detected, for example when the ECG signal reaches a predetermined threshold).

In these embodiments, the determination, by electronic unit 10, of whether the one or more conditions are satisfied may be performed in response to a manual triggering by the operator, carried out for instance via the touch screen of the central unit 7.

As represented in FIG. 8, to obtain the plurality of measurements of the mechanical property, the electronic unit 10 may be configured to control low frequency vibrator 5 to deliver to body 8 of the subject a plurality of pulses MP (referred to as "mechanical pulses"), each pulse MP being a transient, low frequency mechanical pulse. Each mechanical pulse MP corresponds to a transient displacement d of the shaft 4' along the axis z directed towards the subject's body (see FIG. 5). At least one of the mechanical pulses MP is delivered based on an event related to the ECG signal of the subject, for example upon detection of a peak in the ECG signal (or, equivalently, in the synchronization signal obtained based on the ECG signal).

Control module 20 may be configured (for instance, programmed via machine executable instructions stored in a memory) to control motion controller 30 in order to displace shaft 4'. For example, shaft 4' displacement d may be controlled according to a predetermined command signal. In particular, the displacement d may be controlled by a control-loop comprising amplifier 31, displacement sensor 11, signal conditioning module 32, and a vibration control module 24 (as represented in FIG. 7), such as a PID (proportional, integral, derivative) corrector (still, in alternative embodiments, the vibrator may be controlled by an open loop—that is with no sensor feedback). The displacement d of shaft 4' induced by the vibrator is a transient displacement corresponding, for example, to one period of a sinusoid having a duration T between 5 ms and 50 ms.

The displacement d of shaft 4', induced by vibrator 5, has a peak-to-peak amplitude A between 0.2 mm and 10 mm, and in an embodiment between 0.5 and 2 mm.

The central frequency of each mechanical pulse MP may be between 10 Hz and 500 Hz, for example between 50 Hz and 200 Hz when the elastography device is configured to characterize the liver of patients (typically 50 Hz in this case).

As illustrated in the third and fourth graphs of FIG. 8 (graph of tip's displacement d over time and graph of ultrasound U/S pulses over time), for each mechanical pulse MP, the electronic unit 10 controls U/S (ultrasound) transducer 6 (with the U/S pulser 41 of the U/S front end 40, among others) so that U/S transducer 6 emits a sequence Seq of ultrasound pulses USP, and acquires echo signals received in response by U/S transducer 6, to track how the mechanical pulse MP propagates through the probed region 80 of the body 8 of the subject, located in front of tip 4 of the probe.

For this sequence Seq, the central frequency of each ultrasound pulse USP is comprised for instance between 0.5 and 10 megahertz. The ultrasound pulses of the sequence Seq may be transmitted one at a time, two successive pulses being separated by a pulse repetition period RP, this pulse repetition period being typically between 0.1 millisecond and 2 milliseconds (which corresponds to a pulse repetition frequency between 0.5 kilohertz and 10 kilohertz), and in an embodiment between 0.3 ms and 1 ms. The ultrasound pulses USP of the sequence Seq mentioned above may also be transmitted by groups, for instance by groups of two pulses (to compute correlations between the two corresponding echo signals). The two pulses of each group may be separated by duration between 50 and 200 microseconds, while the groups of pulses themselves are separated by a longer duration, for example higher than 0.2 or 0.5 ms. It will be appreciated that other transmission sequences can also be considered in various embodiments. The total duration of the sequence of U/S pulses Seq may be between 25 ms and 200 ms. This duration may be selected depending on the shear wave frequency and depending on the speed of propagation of the elastic wave which is the slower and depending on the depth of the region to be observed and the nature of the organ being assessed. For example, in an embodiment, for a shear wave frequency of 50 Hz, an 80 mm depth and a speed of propagation of 1 m/s (typical for shear waves in the liver of a subject), the sequence may have a duration of 100 ms.

The echo signals, which are acquired to track the propagation of the mechanical pulse considered, are each formed by a signal, received over time t by the U/S transducer 6 after emission of one of the U/S pulses USP. It is more precisely the signal received within a given temporal window starting after this emission and having a given duration.

It will be appreciated that other U/S sequences may be emitted independently from the U/S sequences Seq and inserted in the chronogram for other applications and uses. For example, other U/S sequences may be emitted for determining a breath holding indicator to indicate that the subject is holding his breath.

In the embodiments described herein, for each mechanical pulse MP, electronic unit 10 determines tissue strain data, representative of tissue strain within the region 80, as a function of time t and as a function of depth z within the region 80. The tissue strain data may be called elastogram or shear wave propagation map. The tissue strain data is determined from the echo signals acquired to track how the mechanical pulse MP propagates through the region 80. As mentioned above, when represented graphically, as a function of time and depth (like in FIG. 1), such tissue strain data forms an elastogram, from which a measurement $E_k$ of the mechanical property (e.g. the tissue stiffness) may be determined (as represented in bottom graph of FIG. 8).

The tissue strain data is determined from the echo signals using a correlation technique or another patterning matching algorithm to determine how portions of the tissue move under the influence of the elastic wave that is passing through it (the elastic wave being generated by the periodic mechanical vibration delivered by the system). For example, for each couple of two successively received echo signals, the two echo signals are divided into smaller signal windows which correspond to different depths. The signal windows are correlated with each other, by the correlation module 25 (see FIG. 7), which makes it possible to determine tissue displacement (namely, the tissue displacement that occurred between the two U/S pulses), as a function of depth, and at given time.

As mentioned above, for each mechanical pulse MP, or at least for several of them, respective tissue strain data may be obtained and a respective measurement ($E_{k-1}$, $E_k$ in the bottom graph of FIG. 8) of the mechanical property of the region 80 may be determined. Each determined measurement $E_n$ may be associated with a respective time $t_n$ which represents the instant at which the measurement is performed. For example, in the embodiment represented in FIG. 8, each measurement $E_n$ is associated with a respective time $t_n$ equal to the time at which the corresponding mechanical pulse MP has been emitted. This is not limiting and other embodiments are possible. For example, each measurement $E_n$ may be associated with a respective time $t_n$ equal to the time at which the last of the echo signals is acquired in response to the emission of the corresponding sequence Seq of U/S pulses USP. Alternatively, each measurement $E_n$ may be associated with a respective time $t_n$ equal to the time at which the shear wave reaches the middle of the region of measurement within which the speed of the shear wave is being determined. It is noted that the values of times $t_n$ obtained by all these embodiments differ very little from each other, and that this difference has little impact on the interpretation of the obtained measurements $E_n$.

The mechanical property of the tissue, related to low frequency shear wave propagation, may be a quantity related to the tissue stiffness, such as the propagation speed of shear waves Vs, the shear modulus of the tissue or the Young's modulus E of the tissue (which can be derived from the slope of the stripes identified in the elastogram, or from the variation of the time of flight of the measurement pulse as a function of depth). It may also be any parameter related to shear wave propagation in the tissue, like viscosity.

As mentioned above, at least one measurement of the mechanical property is determined based on an event related to a signal related to the cardiac activity of the subject (hereinafter also referred to as "cardiac signal"). The event related to the cardiac signal may be a specific feature in the cardiac signal, for example a rising edge or a falling edge, which may be detected, for example, when the cardiac signal value reaches a predefined threshold while increasing or decreasing. In the example represented in FIG. 8, the cardiac signal is an ECG signal, represented in the top curve. The second curve represents the synchronization signal. In this example, an event related to the ECG signal is detected each time a rising edge of the ECG signal reaches a predefined threshold Th. As soon as or when electronic unit 10 detects that the value of the signal exceeds the threshold Th in a rising edge, a corresponding pulse is emitted on the synchronization signal (here, a downward pulse). This pulse has a predefined duration δt of few milliseconds (ms) for example. In the embodiments in which it is desired to perform at least one measurement per cardiac cycle, the duration δt of this pulse is shorter than the cardiac period.

In the example of FIG. 8, for each peak of the ECG signal, the ECG curve crosses the threshold value Th twice (one just before the peak, and one just after). It will be appreciated that the corresponding peak in the synchronization signal is only emitted for one of these two crossings (for example, when the ECG signal is rising or when it is falling).

In the example of FIG. 8, a mechanical pulse is delivered after or at the end of a temporal offset Δt that follows the beginning of the peak of the synchronization signal. The temporal offset Δt is used to explore values of the mechanical property at different times during the cardiac cycle. The temporal offset Δt may be set by the user to measure the mechanical property at a given moment of the cardiac cycle. For example, when the user wants to obtain a measurement synchronized with a peak of the cardiac cycle, the temporal offset Δt can be set to 0. The period of the cardiac cycle is typically of about 1 second. Therefore, the temporal offset Δt may vary between 0 and 1 second (the period of the cardiac cycle). It is noted that the average period (duration) of the cardiac cycle of the subject may be estimated from the cardiac signal, as detailed below. Therefore, the temporal offset Δt may vary between 0 and the estimated period of the cardiac cycle of the subject. In the example of FIG. 8, it is desirable that the measurement of the mechanical property be made before the next ECG peak.

The measurement of the mechanical property requires acquisition and processing time which results in a measurement delay with the cardiac signal. The acquisition time itself typically lasts about 80 milliseconds (ms). Moreover, the measurement delay of the mechanical property can vary depending on the mechanical property value itself. Indeed, when the mechanical property is liver stiffness, the actual probing time can be estimated as the arrival time at which the shear wave reaches the middle of the region of interest. As a consequence, the arrival time depends on the tissue stiffness itself. Therefore, a compensation delay may be applied to resynchronize the liver stiffness signal with the cardiac signal in order to analyze these two signals in relation to each other (for example to display in parallel the cardiac signal and liver stiffness signal). In an embodiment, an even more precise compensation can be carried out by integrating the real time of probing of the mechanical property into the delay.

Other embodiments are possible. For example, the mechanical pulses may be delivered after or at the end of a temporal offset Δt that follows the beginning of the peak of the synchronization signal.

In one or more embodiments where it is not sought to perform measurements at a same moment of the cardiac cycle, for example the embodiments represented in FIG. 9b or 9c and described in more detail below, the temporal offset Δt may be variable from one measurement to another. This makes it possible to explore values of the mechanical property at different times during the cardiac cycle. For example, as represented in FIG. 9c, the temporal offset Δt associated with measurement $E_n$ (n being a strictly positive integer) may be equal to $\Delta t_0 + (n-1)\alpha$.

As detailed above, for each mechanical pulse MP, a corresponding sequence Seq of ultrasound pulses USP is emitted. Electronic unit 10 then acquires echo signals received in response to track how the mechanical pulse MP propagates through the probed region and to determine one measurement $E_{k-1}$, $E_k$ of the mechanical property.

In the example of FIG. 8, one measurement is determined each time the ECG signal exceeds the predefined threshold Th, for at least a portion of the ECG signal. Indeed, as mentioned above, the determination of the measurements may be conditioned to other conditions, for example a condition related to the fact that the position and direction of the probe 2 is adequate (as detailed for instance in U.S. patent application Ser. No. 17/695,053 assigned to the applicant) and/or a condition related to the fact that tip 4 is applied against body 8 of the subject (for example, based on contact force level measured by a force sensor—like a strain gauge—or deduced from the position of shaft 4' pushed into the casing when the tip is pressed on the subject's body) and/or a condition related to the fact that the subject is holding his breath (as detailed later in the description). Therefore, in an embodiment, a measurement is determined each time the ECG signal exceeds the predefined threshold Th in a portion of the ECG during which all these other conditions are satisfied. From the plurality of measurements determined, it is then possible to extract one feature representative of the LSM of the subject. For example, this feature may be the median or the mean of the plurality of measurements (as is conventionally done in elastography methods), or any feature derived from one or more statistical parameter(s) calculated from the plurality of measurements, for example the maximum, the minimum, the mean, the standard deviation and/or a percentile.

This makes it possible to determine a plurality of measurements comprising exactly one measurement per cardiac cycle, each measurement being taken at a same moment of the cardiac cycle (in the example of FIG. 8, all measurements are taken after a predefined temporal offset $\Delta t$ following a peak of the R wave of the ECG curve). Thus, the variability of the measurements is reduced. Indeed, as explained above with reference to FIG. 3, the inventors have demonstrated that the LSM is not constant and that it varies as a function of time, and that its variations are linked to the variations of the CVP over time. Thus, measuring LSM values at the same instant of the subject's cardiac cycle makes it possible to overcome (at least in part) the variability of LSM during the cardiac cycle.

Therefore, synchronizing the measurements of LSM with the ECG signal as implemented in FIG. 8 makes it possible to eliminate the variations due to the LSM time-dependency associated with the cardiac cycle. This can be used to increase the precision of LSM when targeting liver fibrosis assessment, for example. Indeed, in such case the medical practitioner wants to obtain a single value of LSM to interpret it. Without synchronization, the LSM value would likely present large variation since it is obtained using the mean or the median of several measurements obtained randomly during the cardiac cycle. The synchronization of LSM to the ECG signal can also be used to improve the signal-to-noise ratio of LSM measured during the cardiac cycle. Several estimates of LSM obtained at same moments of successive cardiac cycles can be averaged to increase the signal-to-noise ratio.

In one or several embodiments, the predefined threshold Th can be determined before starting the determination of the measurements of the mechanical property. For example, it is possible to extract the maximum (when the event corresponds to an upward peak of the ECG signal) values of the ECG signal (each time an upward peak is reached), to compute an indicator of this value (for example, a mean, a median, a minimum, etc.) and to determine the threshold Th based on this indicator. For example, the threshold Th can be a fraction of the indicator, for example 0.9 times the value of the indicator. This example is not limiting and other fractions may be used, for example 0.8, 0.85, 0.95, etc. The determination of the threshold Th may be one of the conditions for the electronic unit to enter the measurement mode (i.e., while the threshold Th is not determined, the measurements cannot begin).

Other embodiments are possible. For example, the threshold Th may have been determined as described above during a previous medical examination and may have been recorded in a memory. The recorded value can then be provided as input to the electronic unit 10 to be used for determining when an event related to the ECG signal occurs.

The temporal offset $\Delta t$ can be a predefined value, for example a constant equal comprised between 0 and 2,000 milliseconds (ms). Alternatively, the temporal offset $\Delta t$ can be determined before starting the determination of the measurements of the mechanical property. For example, an average duration of the cardiac cycle can be estimated from a portion of the ECG signal (by determining the durations between successive peaks and averaging these durations) and the temporal offset $\Delta t$ can be set between 0 and the average duration of the cardiac cycle (or 0 and a fraction of the average duration of the cardiac cycle, for example 0.9 times the average duration of the cardiac cycle).

The number of measurements determined is typically greater than 1, in particular between 5 and 15 (for example 10 measurements, as in conventional elastography techniques).

Figure 9A:
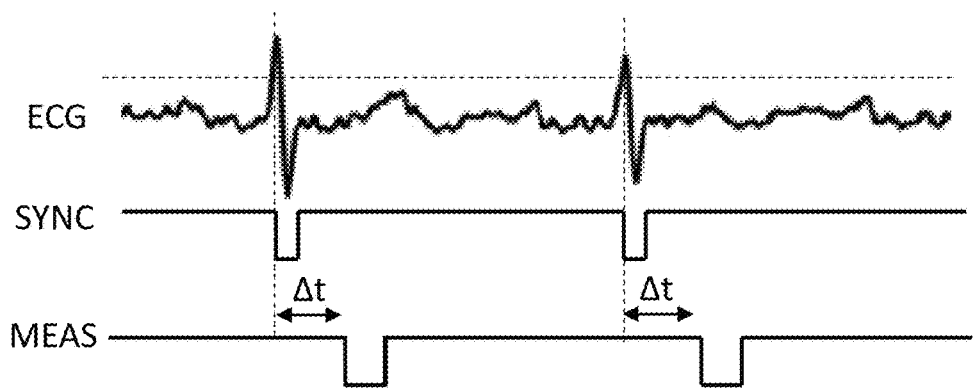
FIGS. 9a, 9b and 9c represent determinations of at least one measurement based on an event related to the Electrocardiogram signal in several embodiments of the invention.
Figure 9B:
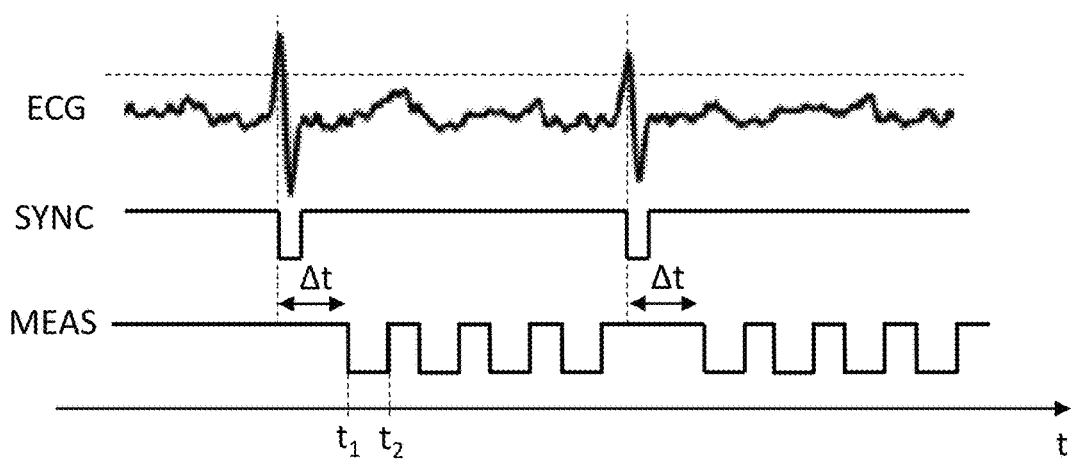
Figure 9C:
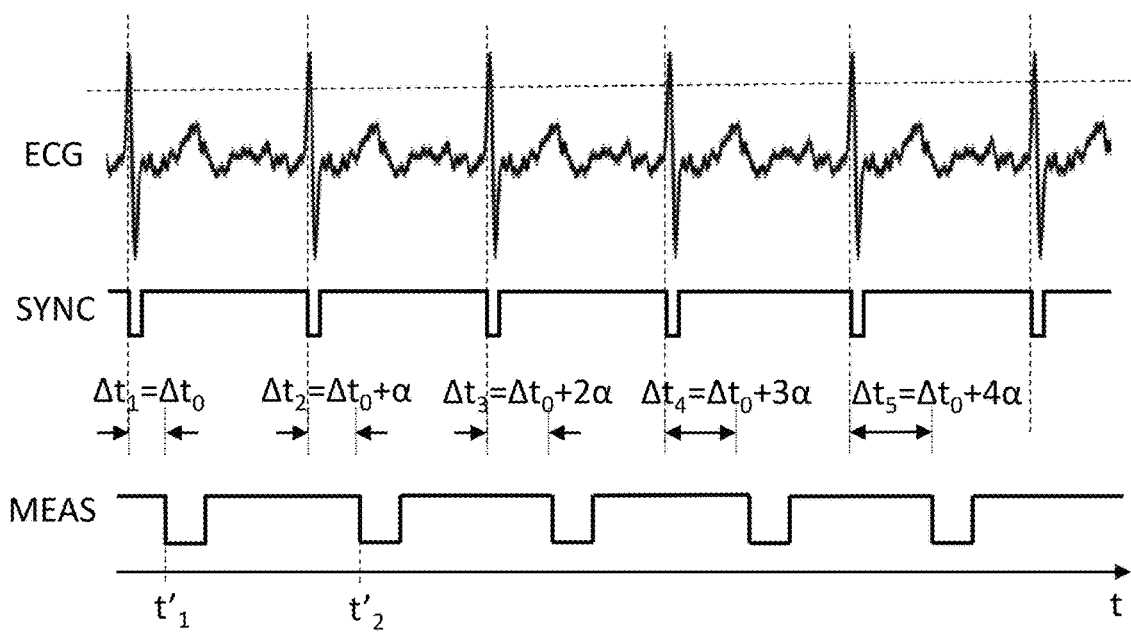

FIGS. 9a, 9b and 9c represent different embodiments for determining measurements from the ECG signal. The embodiment of FIG. 9a corresponds to that of FIG. 8, previously described. In each of FIGS. 9a, 9b and 9c, the top curve corresponds to the curve of the ECG signal over time, the middle curve corresponds to the synchronization signal as introduced above and the bottom curve represents the determination of the measurements. In the bottom curve, each window corresponds to one respective measurement, including the emission of a mechanical pulse and an ultrasound sequence as described above. In these examples, the synchronization signal is set to low when an event is detected. This detection corresponds to the synchronization time which result in a measurement after or at the end of a temporal offset $\Delta t$. The choice of using a synchronization signal set to low is arbitrary. It can be set to high when an event is detected.

In the embodiment of FIG. 9b, each time the ECG signal (or at least a portion of the signal, as mentioned above) exceeds the threshold Th, the determination of a respective series of measurements is automatic. In this example, the first measurement of each series of measurements is determined after or at the end of a fixed temporal offset $\Delta t$ following the end of a peak (or a "window") in the synchronization curve. The temporal offset $\Delta t$ can be for example between 0 and 2000 milliseconds (ms). This temporal offset is not necessarily fixed and may vary from one series of measurements to another.

In one or several embodiments, each series of measurements may comprise at least 2 measurements per cardiac cycle, i.e. at least 2 measurements between two successive events (one event corresponding to the threshold being exceeded by the ECG curve). By acquiring measurements at such repetition rate, it is possible to observe variations of the LSM during the cardiac cycle of the subject and to reconstruct the LSM signal of the subject. Indeed, the measurements correspond to samples of the stiffness signal E(t) over time. For example, if each measurement $E_k$ is associated with a respective time $t_k$, the signal E(t) can be reconstructed from the measurements $E_k=E(t_k)$ by, for example, linear interpolation or spline interpolation.

To increase the precision of the constructed signal, the measurements may be acquired at shorter times, i.e. at a higher repetition rate, for example at least 4 measurements per cardiac cycle (e.g. 4, 5, 6, 7, 8, 9, 10 measurements per second or more than 10 measurements per second). The higher the repetition rate, the more accurately the variations of the signal are captured, but the greater the computational resources are to be implemented.

In the example of FIG. 9b, the measurements of the same series of measurements are regularly spaced in time (in other words, the time between two consecutive measurements is fixed and measurements are carried out at a regular interval). This is not limiting and other embodiments are possible. For example, the time between two consecutive measurements of a same series of measurements may be variable in another embodiment.

As mentioned above, the inventors have demonstrated that the stiffness of a region of a subject's liver was not, contrary to what one might think, a constant value, but, instead, it varies over time. In particular, it was found that the variations of the Central Venous Pressure over time can be found in the measurement of the stiffness of the liver. In other words, the stiffness of the liver is a function whose values vary over time, in particular during a cardiac cycle. Therefore, obtaining the stiffness signal (and its variations during a cardiac cycle) has a relevant medical value, and makes it possible to more accurately determine certain indicators relating to stiffness (the median of the signal, for example).

Once the stiffness signal as a function of time is obtained, in an embodiment, one or more indicators of the mechanical property may be extracted therefrom, for example a mean, a percentile, an extremum, a function or combination of these indicators, etc. Such indicators beneficially take into account the variations of the stiffness signal during the cardiac cycle, which is not the case with conventional elastography methods where an indicator is calculated from a plurality of point measurements taken at random.

It is noted that such indicators obtained directly from the LS signal remains more precise than information that would be obtained from consecutive elastograms, for example by taking an average of the elastograms to obtain a single LSM value.

Indeed, variations due to CVP (or equivalently to blood pressure) superimpose to variations associated with the movement of the liver in front of the probe during breathing. In the liver, the shear wave frequency that is used to probe liver stiffness is typically equal to 50 Hz, which corresponds to a transient vibration of about 20 milliseconds (ms). Consecutive measurements of liver stiffness require that the time interval between consecutive mechanical pulses be at least a few periods for the shear waves not to superimpose. For a 50 Hz center frequency shear wave, given that the shear wave speed can be as slow as 1 m/s and is typically tracked until 80 mm depth, the propagation takes up to 80 milliseconds (ms) to which the shear wave period of typically 20 milliseconds (ms) (for a transient vibration) should be added to reach 100 milliseconds (ms). This implies that the repetition rate can hardly exceed 1 pulse every 100 milliseconds (ms). With such repetition rate, it is not possible to neglect the cardiac cycle which period is typically of the order of a second. Since the maximum repetition rate of mechanical pulses is not fast enough to neglect the variations due to the cardiac cycles, averaging consecutive elastograms before computing liver stiffness would not result in a better estimate of liver stiffness, even if the subject holds his breath.

Alternatively or in addition, a feature representative of the mechanical property (for example, the liver stiffness) of the subject may also be determined based on spectral characteristic(s) of the obtained signal E(t) (or a part of it), obtained by performing a spectral analysis of the obtained signal E(t) (or a part of it). For example, the spectral analysis may be performed on the part of the signal corresponding to a time interval during which the subject is holding his breath.

Indeed, as it can be seen in the curve representative of the signal E(t) of the liver stiffness measurement over time represented in FIG. 3, when the subject is holding his breath, the corresponding portion of the curve presents periodic or pseudo-periodic variations, that is believed to correspond to variations of the Central Venous Pressure as detailed above. By "pseudo-periodic", it is meant that the signal is not strictly periodic, but its curve comprises a succession of similar patterns which repeat themselves for substantially equal time intervals. When the subject is not holding his breath, the signal E(t) is too noisy to observe such periodic or pseudo-periodic variations.

For such periodic or pseudo-periodic signals, a spectral analysis makes it possible to obtain spectral characteristics such as the center frequencies of the peaks in the frequency domain, the bandwidths of the peaks at −3 dB (or other thresholds such as −6 dB, etc.), the relative heights of the peaks, etc. These spectral characteristics may also be used for determining one or more feature related to the liver stiffness of the subject, but also one or more feature related to the Central Venous Pressure of the subject (which are classically obtained by invasive techniques such as catheterization).

For example, a Fourier Transform may be applied to the portion of the signal corresponding to a time interval during which the subject is holding his breath (which may be determined, as mentioned above, by using a breath holding indicator for example). The breath holding indicator may be determined by computing a correlation coefficient between successive ultrasound signals and comparing the computed correlation coefficient to a predefined threshold. Other embodiments are possible. For example, the elastography device may comprise or may be connected to a breath sensor or respiration sensor and the breath holding indicator may be obtained from measurements data of the breath sensor.

The signal spectrum obtained may comprise a diffuse peak around the period associated with the periodic or pseudo-periodic variation (the period corresponding to the duration of the cardiac cycle of the subject). A band-stop filter (with a stopband defined based on the width of the peak) can then be applied to eliminate the periodic or pseudo-periodic variation of the signal, and a processed signal E' (t) corresponding to the signal E(t) deprived from this periodic or pseudo-periodic variation can be obtained by an inverse Fourier Transform. The feature related to the liver stiffness of the subject may then be obtained from this processed signal E' (t), by example by taking the mean or the median or any function of statistical characteristics of the processed signal E' (t).

Also, in some embodiments, a feature or information related to the Central Venous Pressure (CVP) of the subject may be determined from the obtained stiffness signal E(t) (instead or in addition to the feature relating to the stiffness of the subject). For example, the periodic or pseudo-periodic variation observed in the signal E(t) when the subject holds his breath is linked to the value of the CVP, and extracting this periodic or pseudo-periodic variation, or a part of it, may provide information related to the variation of the CVP over time. By studying variations of the periodic or pseudo-periodic component of the signal E(t), the medical practitioner may be able to detect an anomaly in the curve of the CVP which may suggest a cardiac pathology of the subject. In other words, the stiffness signal E(t) may be used to extract a profile (or "waveform", or "trace") of the CVP curve (for example, the patterns corresponding to the a, c and v-waves and the x and y-descents), which can be used by the medical practitioner for informational or diagnostic purposes. This waveform may be displayed along with the cardiac signal so that the medical practitioner can visualize the mechanical property waveform during the cardiac period, which can have high diagnostic value.

In one or several embodiments, the information related to the CVP of the subject may be a value of the CVP estimated from the LSM signal. Indeed, there is a good correlation between the right atrium pressure RAP (or central venous pressure) and liver stiffness LS. For example, the following relation may be established: RAP=−5.8+6.7 In (LS). It is therefore possible to convert a measurement related to the liver stiffness expressed in kilopascals or meter/second into an estimation of the value of the right atrium pressure or the central venous pressure expressed in mmHg. For example, the mean of the LSM signal may be calculated and used to estimate the average CVP by using the above relation.

It is noted that acquiring at least 4 measurements during a cardiac cycle, which has an average duration of approximatively 1 second for an adult subject, may be very computationally intensive, and may therefore require that the electronic unit 10 of the elastography device 1 be adapted. For example, it is possible to use a pre-compensation technique as described below with reference to FIG. 7.

The threshold value Th may be a predefined value or may be predetermined (i.e. determined before starting the measurements) from a portion of the ECG signal as detailed in reference with FIG. 8.

The temporal offset Δt can be a predefined value, for example a constant equal comprised between 0 and 2000 milliseconds (ms). Alternatively, the temporal offset Δt can be determined before starting the determination of the measurements of the mechanical property. For example, an average duration of the cardiac cycle can be estimated from a portion of the ECG signal (by determining the durations between successive peaks and averaging these durations) and the temporal offset Δt can be set to a fraction of the estimated average duration of the cardiac cycle, for example 0.05 times the estimated average duration of the cardiac cycle.

Each series of measurements comprises a plurality of measurements, for example between 2 and 10 measurements. The repetition rate, which corresponds to the number of measurements per second, may be predefined. For example, the repetition rate may be a fixed value comprised between 2 and 10 measurements per second, or it may be predetermined (i.e. determined before starting the measurements) from a portion of the ECG signal, to take into account the average duration of a cardiac cycle of the subject. For example, the repetition rate may be set to correspond to a predefined number of measurements during a cardiac cycle. As an example, if the estimated average duration of the cardiac cycle is equal to 0.8 s, to obtain an average of 5 measurements per cardiac cycle, the time between two measurements may be set to: 0.8/5=0.16 s. This calculation may take into account the temporal offset Δt between a synchronization peak and the first measurement of the series, by subtracting the temporal offset Δt from the estimated average duration. Also, to ensure that 5 measurements are actually taken for a large majority of the cardiac cycles, the obtained time may be slightly reduced. In this example, the time between two measurements may be set to 0.13 s.

The number of series of measurements determined can be equal to 1 or be greater than 1, for example greater than 3.

In the example of FIG. 9c, each time the ECG signal (or at least a portion of the signal, as mentioned above) exceeds the threshold Th, a measurement is automatically determined after a variable temporal offset $\Delta t_k$ following the beginning of a peak in the synchronization curve. In some embodiments, the variable temporal offset $\Delta t_k$ may increase over time. In the example represented in FIG. 9c, for a measurement $E_k$ associated with a respective time $t_k$ (k being a strictly positive integer), the temporal offset $\Delta t_k$ is equal to $\Delta t_0 + (k-1) \times \alpha$, where $\alpha$ is a fixed strictly positive value, which can be of the order of a few milliseconds (ms) to a few hundreds of milliseconds (ms) for example, and $\Delta t_0$ is a fixed value typically comprised between 0 and 1 second, for example between 0 and a few tens or hundreds of milliseconds (ms). When the temporal offset $\Delta t_k$ exceeds the duration of cardiac cycle, the series of temporal offsets may be reset to zero or to a predetermined value (for example $\Delta t_0$ in the case of FIG. 9c), so that there is always a measurement made during a cardiac cycle, i.e. between two successive peaks in the ECG curve.

This embodiment makes it possible to determine a series of measurements taken at different moments of the cardiac cycle, which may provide important information for the medical practitioner, such as the mean or the median value of LSM during the cardiac cycle, the amplitude of variation of the LSM during the cardiac cycle, etc.

Also, this embodiment makes it possible to recover a profile (or "trace" or "waveform") of the LSM curve or of the CVP curve, as in the embodiment of FIG. 9b, without however having to determine very close measurements, which can become computationally intensive and may require that the electronic unit be adapted, as mentioned above). For example, if one LSM measurement is obtained at each cardiac cycle, using a temporal offset that is increasing by 100 milliseconds (ms) at every new cardiac cycle, then after 10 cycles, a full profile of LSM during a cardiac cycle (whose duration is about 1 second) is obtained with 10 points separated by 100 milliseconds (ms).

In other words, in the embodiment of FIG. 9b, two consecutive measurements $E_1$, $E_2$ are taken at two respective temporal offsets $\Delta t_1$ and $\Delta t_2$ during the same cardiac cycle, and in the embodiment of FIG. 9c, two consecutive measurements $E'_1$, $E'_2$ are taken at two respective temporal offsets $\Delta t'_1$ and $\Delta t'_2$ belonging to two consecutive cardiac cycles. For example, $\Delta t'_1$ can be equal to $\Delta t_1$, and $\Delta t'_2$ can be equal to ($\Delta t_2$+duration of the cardiac cycle), such that the measurements ($E_1$, $E'_1$) and ($E_2$, $E'_2$) are taken at similar moments or instants of the cardiac cycle.

In some embodiments, the difference between two successive temporal offsets $\Delta t_k$, $\Delta t_{k+1}$ may be small enough to be able to extract, from successive measurements, information on the variation of the LSM (and therefore of the CVP) during a cardiac cycle. For example, $\Delta t_{k+1} - \Delta t_k$ may be comprised between CC/20 and CC/4, where CC is the average duration of the cardiac cycle, which may be estimated as detailed above.

In embodiments of FIGS. 9b and 9c, when it is desired to extract from the measurements of the mechanical property (e.g. the stiffness) information relating to the CVP of the subject, it is desirable that the subject holds his breath.

Indeed, as mentioned above and represented in FIG. 3, when the subject breathes, the stiffness signal is very noisy and the variations of the LSM linked to the cardiac cycle are hidden in noise, and are therefore difficult to analyze. Therefore, in some embodiments, it is possible to check beforehand that the subject holds his breath before starting the measurements. In particular, it is possible to determine automatically, from an indicator called "breath holding indicator", if the subject is holding his breath and to authorize (e.g. automatically) the determination of measurements only if or when the indicator indicates that the subject is holding his breath.

The optional pre-compensation technique mentioned above is presented now, with reference to FIG. 7. It is noted that this pre-compensation technique is not mandatory. However, it makes it possible to accelerate processing of the data, and therefore facilitates acquisition of measurements of the mechanical property very close together in time (for example 4 to 10 measurements per second, as in the embodiment of FIG. 9b).

When processing the ultrasound echo signals acquired, in order to determine tissue strain, it is desirable to compensate for the tip's displacement d. Indeed, as the ultrasound pulses sent to probe the medium displacement are emitted by the tip end, the tip displacement, which is quite significant, adds up to the to-be measured tissue displacement. To reduce the correlation computation time, and to increase the signal-to-noise ratio, it is thus desirable to compensate for this displacement. Known compensation techniques are based on a post-processing of the echo signals, in which strong echoes are identified and employed to realign temporally these signals. But such a technique is time-consuming, and not well suited to be implemented in a special purpose processor like processor 60 (which may be an FPGA, for instance). So, in order to compensate for this displacement d, the electronic unit 10 (more specifically, its processor 60) is configured to implement the following pre-compensation technique.

The ultrasound pulses emitted to track the mechanical pulses MP may be configured with:
- a temporal offset upon emission $\delta t_{TX}$, by which the emission of an ultrasound pulse is shifted; and/or
- a temporal offset upon reception $\delta t_{RX}$, by which an echo signal, acquired in response to the emitted ultrasound pulse, is shifted, so as to compensate for a temporal shift of the echo signal with respect to other echo signals acquired, caused by the displacement d of the ultrasound transducer 6 (or plurality of ultrasound transducers), the temporal offset upon emission $\delta t_{TX}$ and/or the temporal offset upon reception $\delta t_{RX}$ being adjusted so that a difference thereof is equal to $\Delta t_0 - 2 \cdot d/v_{us}$, $\Delta t_0$ being a constant offset and $v_{us}$ being the speed of ultrasound in the tissue under examination.

The transducer's displacement is thus compensated from the beginning, without requiring a special post-processing.

In of the embodiment of FIG. 7, the elastography device is more specifically configured so that the temporal offset upon emission is equal to $\delta t_{TX,0} + d/v_{us}$, $\delta t_{TX,0}$ being a constant offset upon emission, while the temporal offset upon reception is equal to $\delta t_{RX,0} - d/v_{us}$, $\delta t_{RX,0}$ being a constant offset upon reception.

To introduce this offset upon emission, control module 20 (and more specifically, first processor 50) may generate a reference transmission control signal $S_{TX}$ (based on a predetermined transmission sequence stored in a memory of the control module, for instance), when a mechanical pulse is to be tracked, this signal being then delayed in a controlled manner, using a controllable delay 23, to produce the transmission control signal $S_{TX}$ sent to U/S front end 40. The temporal shift upon reception $\delta t_{RX}$ may be obtained using a controllable sequencer 22 that selects the appropriate series of values in a digitalized signal outputted by amplifier and ADC 42, using a shift register or another type of digital buffer. A correction module 21 may determine the variable offset $d/v_{us}$, from the digitalized signal outputted by signal conditioning module 32 (digitalized signal which is representative of the signal outputted by the displacement sensor 11). In the embodiment of FIGS. 5 to 7, the displacement d of transducer 6 is its displacement relative to probe's casing 3.

The first processor 50 (e.g. an FPGA) may also include a synchronization module 26 configured to receive the ECG signal $S_{ECG}$ and to generate the synchronization signal SYNC based on the received ECG signal. Synchronization module 26 may be connected to ultrasound front end 40 and to motion controller 30 to deliver at least one mechanical pulse and one corresponding U/S sequence based on the synchronization signal.

Figure 10:
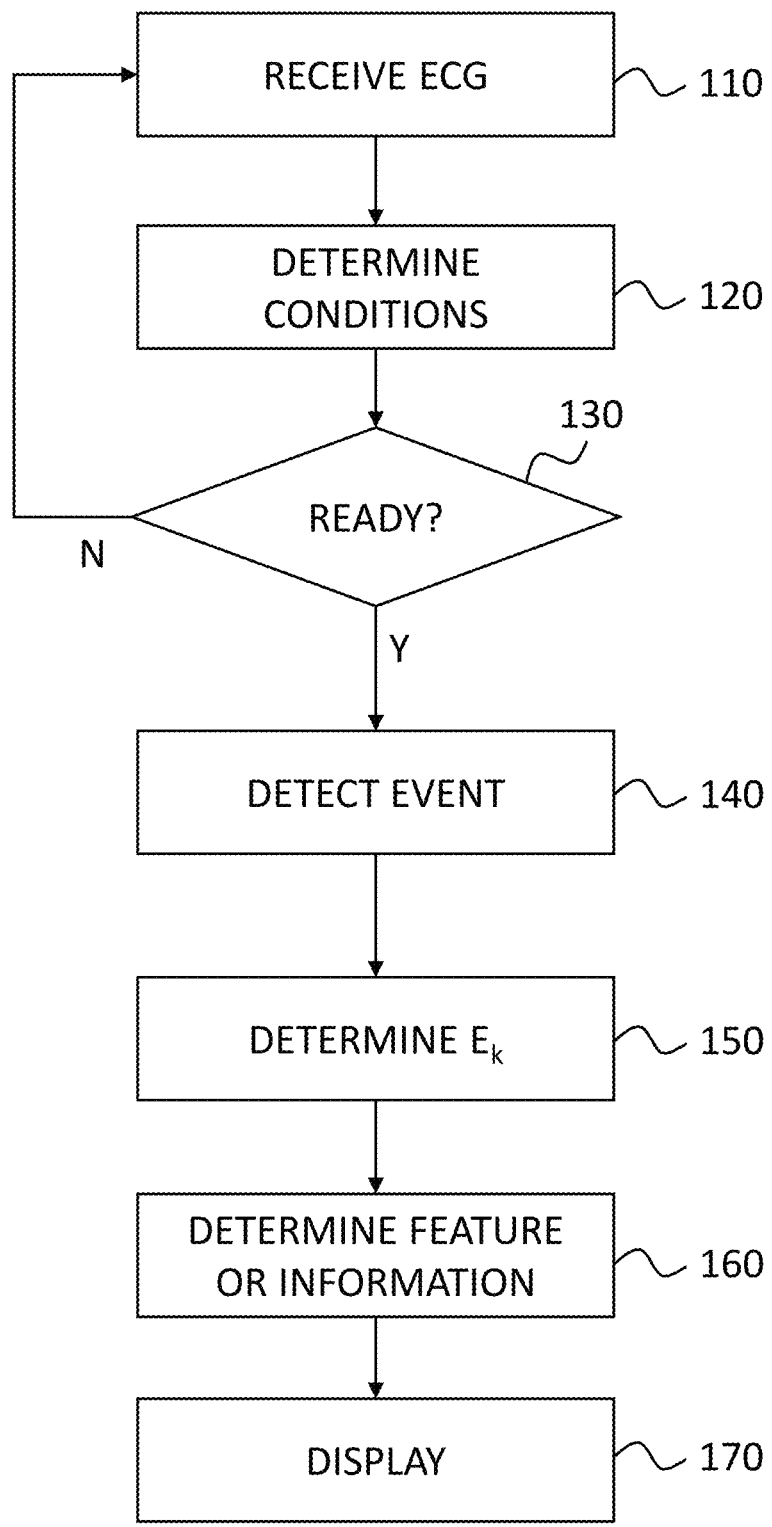
FIG. 10 is a flow-chart describing a possible embodiment of the invention.

FIG. 10 is a flow-chart describing an embodiment of the invention. According to this embodiment, a plurality of measurements of the mechanical property of the region 80 are determined, at least one measurement among the plurality of measurements being determined based on an event related to the ECG signal of the subject. The determined measurements are then used for determining a feature related to the mechanical property. In the following, the mechanical property corresponds to the tissue stiffness, and more specifically a liver stiffness. It will be appreciated that any other mechanical property may be measured, for instance the elasticity, the Young's modulus, the shear modulus, the shear wave speed, the viscoelasticity, the viscosity or any composite biomarker deriving from (or combining) one or more of the previous physical quantities. Also, it will be appreciated that other parts of the body may be considered, for example the brain.

An ECG signal of the subject is received at a first step 110.

At an optional step 120, one or more conditions for the electronic unit to enter the measurement mode may be determined. As mentioned above the "measurement mode" may correspond to a mode in which the electronic unit is ready to start the determination of the measurements. While the electronic unit is not in the measurement mode, no measurements is taken.

The one or more conditions may include, for example:
- a condition as to whether the position and direction of probe 2 is adequate, i.e. whether probe 2 is correctly positioned with respect to region 80 of body 8 for which measurements of the mechanical property are to be obtained. U.S. patent application Ser. No. 17/695,053 assigned to the applicant details examples of determination of such condition; and/or
- a condition as to whether tip 4 is properly applied against body 8 of the subject. Such condition may be determined, for example, based on contact force level measured by a force sensor (like a strain gauge) or deduced from the position of shaft 4' pushed into the casing when the tip is pressed on the subject's body; and/or
- a condition as to whether the subject holds his breath; and/or
- a condition as to whether one or more settings parameters are available.

As an example, the condition as to whether the subject holds his breath can be verified based on a breath holding indicator, which can be obtained from the correlation of successive ultrasound echo signals. Successive ultrasound signals may be emitted through the region of the body explored, and respective echo signals may be received. A coefficient of correlation between successive echo signals may then be computed. A high coefficient of correlation (close to 1) indicates that the tissue located in front of the probe are stable. For example, the indicator may indicate that the subject holds his breath when the coefficient of correlation is below a predefined threshold, for instance 0.9 or 0.95 or 0.99. The pulse repetition period between the collected ultrasound signals can be typically 50 milliseconds (ms), more generally between 5 milliseconds (ms) and 200 milliseconds (ms), typically 100 milliseconds (ms).

By "settings parameters", it is meant here predefined or predetermined parameters used to determine the measurements of the mechanical property, for example, depending on embodiments: the temporal offset Δt, the repetition rate of measurements, the estimated average duration of the cardiac cycle, the threshold Th. The condition as to whether the one or more settings parameters are available is therefore satisfied if all the settings parameters used to determine the measurements of the mechanical property are available at the electronic unit (predetermined or received).

The conditions to be satisfied may be different depending on the information to be extracted from the plurality of measurements taken and/or the way in which the measurements are taken. For example, in the embodiment of FIG. 9a, if one wants to determine a parameter related to the mechanical property, it is not mandatory for the subject to hold his breath. In the embodiments of FIGS. 9b and 9c, if one wants to determine a parameter related to the mechanical property, it is not mandatory for the subject to hold his breath, but if one wants to determine one or more features related to the CVP or the cardiac activity of the subject, it is desirable that the subject holds his breath.

In an optional step 130, the electronic unit 10 may determine whether all conditions determined at step 120 are met or satisfied. While at least one condition is not met or satisfied (step 120, arrow "N"), the electronic unit does not enter the measurement mode and acquisition of the measurements $E_k$ cannot begin. If all conditions are met or satisfied (step 120, arrow "Y"), the electronic unit enters in the measurement mode. Once the electronic unit is in measurement mode, it may monitor the occurrence of an event related to the ECG signal.

At step 140, an event related to the ECG signal is detected. As detailed above, the event related to the ECG signal may correspond to a peak in the ECG curve, which may be supposed to be detected when the ECG signal exceeds (or is below) a predefined threshold Th. The detection 140 of the event related to the ECG signal causes the determination (step 150) of at least one measurement $E_k$ of the mechanical property. As detailed above with reference to FIGS. 9a, 9b and 9c, the detection of the event related to the ECG signal may cause the determination (step 150) of one measurement (as in FIGS. 9a and 9c) or of a series of measurements (as in FIG. 9b). The at least one measurement $E_k$ may be determined (step 150) as described above, with an elastography device as represented in FIG. 5. However, this is not limiting, and any elastography device may be used for determining the measurements $E_k$.

At step 160, at least one feature representative of the mechanical property and/or information related to the CVP of the subject may be extracted from the measurements obtained at step 150.

In various embodiments, the feature representative of the mechanical property may be a single value determined from the obtained measurements. For example, the feature may be a function of the minimum, the maximum, a given percentile, the mean, the standard variation or any statistical characteristic of the obtained measurements. The feature may also be a function of a combination of at least two statistical characteristics.

In the example of FIG. 9a, such feature may provide more accurate information related to the mechanical property than conventional methods. In current elastography techniques, several (e.g. 10) measurements of the stiffness are determined at respective instants that can correspond to very different moments of the cardiac cycles and therefore to very different values of the stiffness. From these measurements, a feature representative of stiffness is computed (e.g. the mean or the median of the measurements), without taken into account such variability. By considering measurements always taken at the same time (at least approximately) of the cardiac cycle, this variability is therefore reduced.

In the examples of FIGS. 9b and 9c, measurements are instead determined at different moments or instants of the cardiac cycle, and reflect the variability of the value of the mechanical property during the cardiac cycle. Therefore, by determining the feature related to the mechanical property from these measurements, this variability is taken into account. The mean, the median or the half-sum of the maximum and the minimum of measurements provides "smoothed" information on the value of the mechanical property, while indicators of dispersion such as the variance or the interquartile range provide information on the amplitude of variation of the value of the mechanical property (which may, in itself, have diagnostic value).

In the examples of FIGS. 9b and 9c, information related to the CVP of the subject may also be determined from the obtained measurements (in alternative or in addition to the feature related to the mechanical property). In the example of FIG. 9b, a signal E(t) may be obtained from the measurements $E_k$ determined at step 150, as detailed above. The signal E(t) may comprise all the measurements acquired or several measurements among all the measurements acquired. For example, an interpolation (for example a linear interpolation or a spline interpolation) may be used to obtain a continuous signal over time, and provide the values of the stiffness between two instants $t_k$, $t_k+1$ associated with two consecutive measurements $E_k$, $E_k+1$. From this signal E(t), it is possible to extract or to analyze periodic or pseudo-periodic variations linked to the CVP or the subject and/or to extract a profile of the CVP curve, as detailed above. Such information may be used by the medical practitioner for diagnostic purposes. A curve representative of the variations of LSM over time during a cardiac cycle may also be reconstructed from measurements obtained in the example of FIG. 9c, by acting as if the measurements obtained on different cardiac cycles belonged to the same cardiac cycle.

At an optional step 170, the at least one feature or one piece of information related to the stiffness and/or the CVP of the subject determined at step 170 can be displayed on a screen, to be used by the medical practitioner. Other information may be displayed, in alternative or in addition. For example, the signal E(t) obtained in the example of FIG. 9b and/or the ECG signal may be displayed. In an embodiment, the ECG signal of the subject and the LSM signal E(t) can be displayed on the same screen. As mentioned above, in this case, a compensation delay may be calculated to take into account the delay between the event and the corresponding measurement. When the LSM signal E(t) and the ECG signal are synchronized (which requires that the temporal delay between an event in the ECG signal and a corresponding measurement of the LSM be determined), the medical practitioner can therefore interpret the LSM signal E(t) in light of the ECG signal.

In an aspect of the invention, the following method can be implemented. First, the elastography probe is positioned on the patient's body and oriented to face the patient's liver. Then, the probe is actuated manually or automatically in order to acquire one or more liver stiffness measurements. The cardiac function of the patient's heart is monitored using the acquired one or more liver stiffness measurements or using both the acquired one or more liver stiffness measurements and an acquired cardiac signal of the patient's heart, such as, e.g., the ECG signal. In an embodiment, the cardiac function of the patient's heart is monitored as the liver stiffness measurements and the cardiac signal are acquired.

The variation of the one or more liver stiffness measurements as a function of time can be observed on a patient monitoring device that simultaneously displays the one or more liver stiffness measurements and the acquired cardiac signal of the patient's heart, which can be used by the medical practitioner to evaluate a particular cardiovascular pathology of the patient.

As mentioned above, even if the elastography device represented in FIGS. 4 to 6 is a Vibration-Controlled Transient Elastography (VCTE) device, aspects of the present invention can be implemented to any type of elastography device making it possible to obtain measurements with a sufficiently high repetition rate (e.g. at least 4 per second). In particular, the present invention may be applied to other TE (Transient Elastography) devices, for example devices implementing ARFI (Acoustic Radiation Force Impulse) or SWE (Shear Wave Elastography) technologies. In ARFI and SWE, unlike in the VCTE technology, a longitudinally moving shear wave is not generated by an external vibrator. In ARFI, pressure radiation generated by ultrasounds is focused in a region of interest. The radiation pressure generates a laterally moving shear wave that is tracked outside the region of interest using ultrasound tracking pulses. The invention may be applied to other elastography techniques such as Magnetic Resonance Elastography using Magnetic Resonance Imaging or Optical Coherence Elastography using Optical Coherence Tomography.

Also, even if the embodiments have been more specifically described in the case where the signal relating to cardiac activity is an ECG signal, the invention is not limited to this example. The invention can be implemented for any type of cardiac signal, for example a cardiac signal measured using an optical system, an ultrasound system, a pressure measurement system, etc.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

The articles "a" and "an" may be employed in connection with various elements and components, processes or structures described herein. This is merely for convenience and to give a general sense of the compositions, processes or structures. Such a description includes "one or at least one" of the elements or components. Moreover, as used herein, the singular articles also include a description of a plurality of elements or components, unless it is apparent from a specific context that the plural is excluded.

A person skilled in the art will readily appreciate that various parameters disclosed in the description may be modified and that various embodiments disclosed herein may be combined without departing from the scope of the invention.

The invention claimed is:

1. An elastography device comprising:
a probe including a low-frequency vibrator configured to generate a transient low-frequency mechanical pulse in a body of a subject and at least one transducer configured to emit ultrasounds, the probe being further configured to acquire echo signals to track a propagation of the transient low-frequency mechanical pulse in the body of the subject;
an electronic unit adapted to determine a plurality of measurements of a mechanical property of a region of the body of the subject using the acquired echo signals, said region being a liver or a spleen, the electronic unit being further adapted to receive a cardiac signal related to a cardiac activity of the subject,
wherein at least one measurement of the mechanical property of the liver or the spleen among the plurality of measurements of the mechanical property is determined upon detection of an event related to the cardiac signal such that the at least one measurement of the mechanical property (a) occurs at least between a P wave and a T wave of a cardiac cycle of the subject or (b) is determined at a time at which a corresponding event related to the cardiac signal is detected delayed by a temporal offset which varies over time.

2. The elastography device of claim 1, wherein the cardiac signal is an electrocardiogram signal, a photoplethysmography signal, a cardiac signal obtained by ultrasound Doppler or a signal related to a blood pressure of the subject.

3. The elastography device of claim 1, wherein the detection of the event related to the cardiac signal corresponds to a detection that the cardiac signal reaches a predefined threshold.

4. The elastography device of claim 1, wherein the electronic unit is further adapted to determine, from the plurality of measurements, a feature related to the mechanical property.

5. The elastography device of claim 4, wherein said feature is a function of a maximum, a minimum, a mean, a standard deviation and/or a percentile of the measurements.

6. The elastography device of claim 1, wherein for each detection of the event related to the cardiac signal, at most one respective measurement is determined.

7. The elastography device of claim 6, wherein each measurement of the plurality of measurements is determined at a respective measurement time, which depends on a time at which the event related to the cardiac signal is detected.

8. The elastography device of claim 7, wherein, for each measurement of the plurality of measurements, the respective measurement time corresponds to a time at which the corresponding event related to the cardiac signal is detected delayed by a predefined temporal offset, the predefined temporal offset being identical for all measurements.

9. The elastography device of claim 7, wherein, for each measurement, the respective measurement time corresponds to a time at which a corresponding event related to the cardiac signal is detected delayed by a temporal offset which varies over time.

10. The elastography device of claim 1, wherein the plurality of measurements comprises at least one series of measurements, wherein each of the at least one series of measurements is determined upon detection of the event related to the cardiac signal.

11. The elastography device of claim 10, wherein the measurements of each of the at least one series of measurements are determined between two consecutive detections of events related to the cardiac signal, wherein each of the at least one series of measurements comprises at least two measurements.

12. The elastography device of claim 1, wherein the electronic unit is further adapted to obtain a breath holding indicator indicating whether the subject holds his breath or not.

13. The elastography device of claim 12, wherein the measurements are determined only when the breath holding indicator indicates that the subject holds his breath.

14. The elastography device of claim 1, wherein the electronic unit is further adapted to determine, from the measurements of the mechanical property, information related to a blood pressure of the subject.

15. The elastography device of claim 14, wherein the mechanical property is a liver stiffness and the information related to the blood pressure of the subject is a value representative of a central venous pressure of the subject.

16. The elastography device of claim 14, wherein the electronic unit is further configured to obtain, from the plurality of measurements, a signal representative of variations of the mechanical property with time, the elastography device being configured to control a display device to jointly display a curve representative of at least a portion of the obtained signal representative of the variations of the mechanical property with time and a curve representative of at least a portion of the cardiac signal.

17. An elastography method, implemented by an elastography device that includes a probe including a low-frequency vibrator configured to generate a transient low-frequency mechanical pulse in a body of a subject and at least one transducer configured to emit ultrasounds, the method comprising:
generating, by the low-frequency vibrator, the transient low-frequency mechanical pulse in the body of the subject and emitting a sequence of ultrasounds by the at least one transducer;
receiving, by the probe, echo signals to track a propagation of the transient low-frequency mechanical pulse in the body of the subject;
receiving a cardiac signal related to a cardiac activity of the subject, and
determining a plurality of measurements of a mechanical property of the region of the body of the subject using the echo signals, said region being a liver or a spleen,
wherein at least one measurement of the mechanical property among the plurality of measurements of the mechanical property of the liver or the spleen is determined upon detection of an event related to the cardiac signal such that the at least one measurement of the mechanical property (a) occurs at least between a P wave and a T wave of a cardiac cycle of the subject or (b) is determined at a time at which the event related to the cardiac signal is detected delayed by a temporal offset which varies over time.

18. A method comprising:
positioning a probe of an elastography device to face a patient's liver so as to acquire one or more liver stiffness measurements by vibration-controlled transient elastography, and
monitoring a cardiac function of the patient's heart using the acquired one or more liver stiffness measurements or using both the acquired one or more liver stiffness measurements and an acquired cardiac signal of the patient's heart,
wherein the one or more liver stiffness measurements are determined upon detection of an event related to a cardiac signal such that the one or more liver stiffness measurements (a) occur at least between a P wave and a T wave of a cardiac cycle of the subject or (b) are determined at a time at which a corresponding event related to the cardiac signal is detected delayed by a temporal offset which varies over time.

19. The method according to claim 18, further comprising observing a variation of the one or more liver stiffness measurements as a function of time on a patient monitoring device that simultaneously displays the one or more liver stiffness measurements and the acquired cardiac signal of the patient's heart.

20. The method according to claim 19, further comprising determining a cardiovascular pathology of the patient using the acquired one or more liver stiffness measurements or using both the acquired one or more liver stiffness measurements and the acquired cardiac signal of the patient's heart.

* * * * *